United States Patent
Lin et al.

(10) Patent No.: US 10,911,283 B2
(45) Date of Patent: Feb. 2, 2021

(54) METHOD OF GENERATING UPLINK SIGNAL SEQUENCE, USER EQUIPMENT, BASE STATION AND COMPUTER-READABLE STORAGE MEDIUM

(71) Applicant: CHINA ACADEMY OF TELECOMMUNICATIONS TECHNOLOGY, Beijing (CN)

(72) Inventors: Xiangli Lin, Beijing (CN); Xuejuan Gao, Beijing (CN); Tony Ekpenyong, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 0 days.

(21) Appl. No.: 16/646,117

(22) PCT Filed: Aug. 8, 2018

(86) PCT No.: PCT/CN2018/099321
§ 371 (c)(1),
(2) Date: Mar. 10, 2020

(87) PCT Pub. No.: WO2019/047660
PCT Pub. Date: Mar. 14, 2019

(65) Prior Publication Data
US 2020/0274746 A1  Aug. 27, 2020

(30) Foreign Application Priority Data
Sep. 11, 2017 (CN) .......................... 2017 1 0813048
Sep. 30, 2017 (CN) .......................... 2017 1 0938305

(51) Int. Cl.
*H04W 72/04* (2009.01)
*H04L 27/26* (2006.01)

(52) U.S. Cl.
CPC ...... *H04L 27/2613* (2013.01); *H04L 27/2614* (2013.01); *H04W 72/0413* (2013.01)

(58) Field of Classification Search
CPC ..... H04B 1/00; H04J 1/00; H04J 11/00; H04J 13/00; H04J 13/22; H04L 5/00;
(Continued)

(56) References Cited

U.S. PATENT DOCUMENTS 7,599,327 B2  10/2009 Zhuang
2009/0201825 A1  8/2009 Shen et al.
(Continued)

FOREIGN PATENT DOCUMENTS

CN  101753286 A  6/2010
CN  101958873 A  1/2011
(Continued)

OTHER PUBLICATIONS

International Search Report in the international application No. PCT/CN2018/099321, dated Oct. 26, 2018.
(Continued)

*Primary Examiner* — Shawkat M Ali
(74) *Attorney, Agent, or Firm* — Ladas & Parry, LLP (57) ABSTRACT

A method of generating an uplink signal sequence, a user equipment, a base station and a computer-readable storage medium are provided. The method includes: generating an uplink signal sequence $r_{u,v}^{(\alpha)}(n)$ based on $r_{u,v}^{(\alpha)}(n)=e^{j\alpha n}\bar{r}_{u,v}(n)$, $0 \le n < 12$, where $\alpha$ is configured to distinguish a terminal, an uplink signal base sequence $\bar{r}_{u,v}(n)=e^{j\varphi(n)\pi/4}$, where u represents a group number, and v represents an intra-group base sequence number, $\varphi(n)\pi/4$ represents a phase of a base sequence; performing a full traversal of multiple possible phases of the phase $\varphi(n)\pi/4$ on the uplink signal sequence with a length of 12, and selecting a predetermined number of uplink signal sequences with a lowest
(Continued)

peak-to-average power ratio and a lowest cross-correlation characteristic.

3 Claims, 5 Drawing Sheets

(58) Field of Classification Search
CPC ....... H04L 5/001; H04L 5/0092; H04L 25/02; H04L 27/26; H04L 27/2613; H04L 27/2614; H04L 29/08; H04W 4/00; H04W 52/36; H04W 52/362; H04W 72/04; H04W 72/08; H04W 72/12; H04W 72/048; H04W 72/041; H04W 72/0446; H04W 72/0453; H04W 72/1278
USPC ....... 370/203, 210, 228, 328, 329, 344, 480; 375/146, 219, 260, 267, 295, 316
See application file for complete search history.

(56) References Cited

U.S. PATENT DOCUMENTS

| | | | |
|---|---|---|---|
| 2011/0051671 A1* | 3/2011 | Chung | H04L 5/003 370/328 |
| 2012/0213190 A1* | 8/2012 | Yoon | H04L 5/0035 370/329 |
| 2013/0329660 A1 | 12/2013 | Noh | |
| 2014/0016576 A1 | 1/2014 | Noh | |
| 2014/0286329 A1* | 9/2014 | Han | H04L 5/0053 370/344 |
| 2014/0307661 A1 | 10/2014 | Wu et al. | |
| 2014/0376486 A1 | 12/2014 | Lee et al. | |
| 2015/0085646 A1 | 3/2015 | Vannithamby et al. | |
| 2019/0007175 A1* | 1/2019 | Kwak | H04B 1/713 |

FOREIGN PATENT DOCUMENTS

| | | |
|---|---|---|
| CN | 102142871 A | 8/2011 |
| CN | 102739597 A | 10/2012 |
| CN | 103139916 A | 6/2013 |
| CN | 103973395 A | 8/2014 |
| CN | 104471994 A | 3/2015 |
| CN | 105245320 A | 1/2016 |
| CN | 105474595 A | 4/2016 |
| CN | 106507467 A | 3/2017 |

OTHER PUBLICATIONS

Written Opinion of the International Searching Authority in the international application No. PCT/CN2018/099321, dated Oct. 26, 2018.
First Office Action in Chinese Application No. 201710938305.0, dated Dec. 3, 2019.
Yan Lu, "Research and implementation of FDD-LTE system channel estimation based on pilot", Feb. 15, 2016, with English translation provided by Google Translate.
Qian LV, "Design and implementation of sounding reference signal in LTE", Sep. 15, 2011, with English translation provided by Google Translate.
Shimin Chen, "Research & DSP Implementation of Technologies in LTE Physical Uplink Control Channel", Oct. 15, 2012, with English translation provided by Google Translate.
3GPP Organizational Partners (ARIB, ATIS, CCSA, ETSI, TTA, TTC), TS 36.211 V9.1.0, "Technical Specification Group Radio Access Network; Evolved Universal Terrestrial Radio Acccess; Physical Channels and Modulation (Release 9)", Mar. 2010.
Extended European Search Report from EP app. No. 18854567.7, dated Sep. 24, 2020.

* cited by examiner

FIG.3 generating an uplink signal sequence $r_{u,v}^{(\alpha)}(n)$ based on $r_{u,v}^{(\alpha)}(n) = e^{j\alpha n}\bar{r}_{u,v}(n)$, $0 \leq n < 12$, $\alpha$ is configured to distinguish a terminal, an uplink signal base sequence $\bar{r}_{u,v}(n) = e^{j\varphi(n)\pi/4}$, $u$ represents a group number, and $v$ represents an intra-group base sequence number, $\varphi(n)\pi/4$ represents a phase of a base sequence. — 401 performing a full traversal of multiple possible phases of the phase $\varphi(n)\pi/4$ on the uplink signal sequence with a length of 12, and selecting a predetermined number of uplink signal sequences with a lowest peak-to-average power ratio and a lowest cross-correlation characteristic. — 402

METHOD OF GENERATING UPLINK SIGNAL SEQUENCE, USER EQUIPMENT, BASE STATION AND COMPUTER-READABLE STORAGE MEDIUM

CROSS-REFERENCE TO RELATED APPLICATIONS

This application is the U.S. national phase of PCT Application PCT/CN2018/099321 filed on Aug. 8, 2018, which claims a priority to Chinese Patent Application No. 201710813048.8 filed on Sep. 11, 2017 and a priority to Chinese Patent Application No. 201710938305.0 filed on Sep. 30, 2017, the disclosures of which are incorporated in their entireties by reference herein.

TECHNICAL FIELD

The present disclosure relates to the field of communication technologies, and in particular, to a method of generating an uplink signal sequence, a user equipment, a base station and a computer-readable storage medium.

BACKGROUND

In the Long Term Evolution (LTE) system in the related art, the uplink reference symbol is generated by performing different siftings on a base sequence. The specific generation formula is as follows:

$$r_{u,v}^{(\alpha)}(n) = e^{j\alpha n} \bar{r}_{u,v}(n), \quad 0 \le n < M_{sc}^{RS}$$

$M_{sc}^{RS} = mN_{sc}^{RB}$ represents a length of the reference symbol sequence, and $1 \le m \le N_{RB}^{max,UL}$ represents a quantity of subcarriers corresponding to a resource block (RB), which is 12. The user equipments (UEs) are distinguished by different $\alpha$ values.

The base sequence $\bar{r}_{u,v}(n)$ is divided into 30 groups, $u \in \{0, 1, \ldots, 29\}$ represents a group number, v is an intra-group base sequence number, and the method of generating the base sequence, $\bar{r}_{u,v}(0), \ldots, \bar{r}_{u,v}(M_{sc}^{RB}-1)$ depends on a length $M_{sc}^{RS}$ of the sequence. If $M_{sc}^{RS}$ is less than $3N_{sc}^{RB}$, the base sequence is generated through a computer search, if $M_{sc}^{RB}$ is greater than or equal to $3N_{sc}^{RB}$ the base sequence is generated by a Zadoff-Chu sequence.

For the base sequences with lengths $M_{sc}^{RS} = N_{sc}^{RB}$ and $M_{sc}^{RS} = 2N_{sc}^{RB}$, the base sequence is generated through a computer search and are defined as follows:

$$\bar{r}_{u,v}(n) = e^{j\varphi(n)\pi/4}, \quad 0 \le n \le M_{sc}^{RS} - 1$$

At present, for $M_{sc}^{RS} = N_{sc}^{RB}$, which is 12, the values of φ(n) of 30 groups of base sequences are as follows:

TABLE 1 value of φ(n) of base sequence used in case of $M_{sc}^{RS} = N_{sc}^{RB}$ in LTE

| u | φ(0), . . . , φ(11) | | | | | | | | | | | |
|---|---|---|---|---|---|---|---|---|---|---|---|---|
| 0 | -1 | 1 | 3 | -3 | 3 | 3 | 1 | 1 | 3 | 1 | -3 | 3 |
| 1 | 1 | 1 | 3 | 3 | 3 | -1 | 1 | -3 | -3 | 1 | -3 | 3 |
| 2 | 1 | 1 | -3 | -3 | -3 | -1 | -3 | -3 | 1 | -3 | 1 | -1 |
| 3 | -1 | 1 | 1 | 1 | 1 | -1 | -3 | -3 | 1 | -3 | 3 | -1 |
| 4 | -1 | 3 | 1 | -1 | 1 | -1 | -3 | -1 | 1 | -1 | 1 | 3 |
| 5 | 1 | -3 | 3 | -1 | -1 | 1 | 1 | -1 | -1 | 3 | -3 | 1 |
| 6 | -1 | 3 | -3 | -3 | -3 | 3 | 1 | -1 | 3 | 3 | -3 | 1 |
| 7 | -3 | -1 | -1 | -1 | 1 | -3 | 3 | -1 | 1 | -3 | 3 | 1 |
| 8 | 1 | -3 | 3 | 1 | -1 | -1 | -1 | 1 | 1 | 3 | -1 | 1 |

TABLE 1-continued value of φ(n) of base sequence used in case of $M_{sc}^{RS} = N_{sc}^{RB}$ in LTE

| u | φ(0), . . . , φ(11) | | | | | | | | | | | |
|---|---|---|---|---|---|---|---|---|---|---|---|---|
| 9 | 1 | -3 | -1 | 3 | 3 | -1 | -3 | 1 | 1 | 1 | 1 | 1 |
| 10 | -1 | 3 | -1 | 1 | 1 | -3 | -3 | -1 | -3 | -3 | 3 | -1 |
| 11 | 3 | 1 | -1 | -1 | 3 | 3 | -3 | 1 | 3 | 1 | 3 | 3 |
| 12 | 1 | -3 | 1 | 1 | -3 | 1 | 1 | 1 | -3 | -3 | -3 | 1 |
| 13 | 3 | 3 | -3 | 3 | -3 | 1 | 1 | 3 | -1 | -3 | 3 | 3 |
| 14 | -3 | 1 | -1 | -3 | -1 | 3 | 1 | 3 | 3 | 3 | -1 | 1 |
| 15 | 3 | -1 | 1 | -3 | -1 | -1 | 1 | 1 | 3 | 1 | -1 | -3 |
| 16 | 1 | 3 | 1 | -1 | 1 | 3 | 3 | 3 | -1 | -1 | 3 | -1 |
| 17 | -3 | 1 | 1 | 3 | -3 | 3 | -3 | -3 | 3 | 1 | 3 | -1 |
| 18 | -3 | 3 | 1 | 1 | -3 | 1 | -3 | -3 | -1 | -1 | 1 | -3 |
| 19 | -1 | 3 | 1 | 3 | 1 | -1 | -1 | 3 | -3 | -1 | -3 | -1 |
| 20 | -1 | -3 | 1 | 1 | 1 | 1 | 3 | 1 | -1 | 1 | -3 | -1 |
| 21 | -1 | 3 | -1 | 1 | -3 | -3 | -3 | -3 | -3 | 1 | -1 | -3 |
| 22 | 1 | 1 | -3 | -3 | -3 | -3 | -1 | 3 | -3 | 1 | -3 | 3 |
| 23 | 1 | 1 | -1 | -3 | -1 | -3 | 1 | -1 | 1 | 3 | -1 | 1 |
| 24 | 1 | 1 | 3 | 1 | 3 | -1 | 1 | -1 | -3 | -3 | 1 |
| 25 | 1 | -3 | 3 | 3 | 1 | 3 | 3 | 1 | -3 | -1 | -1 | 3 |
| 26 | 1 | 3 | -3 | -3 | 3 | -3 | 1 | -1 | -1 | 3 | -1 | -3 |
| 27 | -3 | -1 | -3 | -1 | -3 | 3 | 1 | -1 | 1 | 3 | -3 | -3 |
| 28 | -1 | 3 | -3 | 3 | -1 | 3 | 3 | -3 | 3 | 3 | -1 | -1 |
| 29 | 3 | -3 | -3 | -1 | -1 | -3 | -1 | 3 | -3 | 3 | 1 | -1 |

With the development and change of mobile communication service requirements, many organizations such as the International Telecommunications Union (ITU) have begun to study new wireless communication systems (i.e., 5Generation New RAT, 5GNR) for future mobile communication systems. 5G proposes a variety of different uplink channel transmission formats. There is currently no clear solution for the base sequence used for pilot signal transmission and the base sequence used for data frequency domain spreading.

SUMMARY

In view of this, a method of generating an uplink signal sequence, a user equipment, a base station and a computer-readable storage medium are provided in the embodiments of the present disclosure, so as to reduce a peak-to-average power ratio and a correlation between sequences, thereby improving a signal transmission performance and reducing an interference between different sequences of cells.

In a first aspect, a method of generating an uplink signal sequence is provided, including:

generating an uplink signal sequence $r_{u,v}^{(\alpha)}(n)$ based on $r_{u,v}^{(\alpha)}(n) = e^{j\alpha n} \bar{r}_{u,v}(n)$, $0 \le n < 12$, where α is configured to distinguish a terminal, an uplink signal base sequence $\bar{r}_{u,v}(n) = e^{j\varphi(n)\pi/4}$, where u represents a group number, and v represents an intra-group base sequence number, φ(n)π/4 represents a phase of a base sequence;

performing a full traversal of multiple possible phases of the phase φ(n)π/4 on the uplink signal sequence with a length of 12, and selecting a predetermined number of uplink signal sequences with a lowest peak-to-average power ratio and a lowest cross-correlation characteristic.

Optionally, a value of φ(n) of the uplink signal base sequence is: −3, 1, −3, 1, −3, −3, 3, 3, −1, −1, 1, 1.

Optionally, a value of φ(n) of the uplink signal base sequence is: −1, −3, −3, 3, −3, 3, −1, −3, −1, 1, 3, −3.

Optionally, a value of φ(n) of the uplink signal base sequence is: 3, −1, 3, −1, 3, 3, −1, −1, 3, 3, 3, 3.

Optionally, a value of φ(n) of the uplink signal base sequence is: −3, 3, −1, −3, −1, −3, −3, 3, −3, −1, 1, 3.

Optionally, a value of φ(n) of the uplink signal base sequence is: 1, 1, −1, −1, 3, 3, −3, −3, 1, −3, 1, −3.

Optionally, a value of φ(n) of the uplink signal base sequence is: 1, −3, 1, −3, 1, 1, 3, 3, −1, −1, −3, −3.

Optionally, a value of φ(n) of the uplink signal base sequence is: −1, −3, −1, 1, −1, 1, 3, 1, −1, 1, −1, −3.

Optionally, a value of φ(n) of the uplink signal base sequence is: 3, −1, 1, −3, −3, 1, −1, 3, 3, 3, 3, 3.

Optionally, a value of φ(n) of the uplink signal base sequence is: −1, 1, 1, 3, 1, 3, −1, 1, −1, −3, 3, 1.

Optionally, a value of φ(n) of the uplink signal base sequence is: 1, 3, −1, 1, −1, 1, 1, 3, 1, −1, −3, 3.

Optionally, a value of φ(n) of the uplink signal base sequence is: −1, 3, 1, −3, −3, 1, 3, −1, −1, −1, −1, −1.

Optionally, a value of φ(n) of the uplink signal base sequence is: 3, 3, 1, 1, 1, 1, 3, −3, 1, −3, 3, −1.

Optionally, a value of φ(n) of the uplink signal base sequence is: 1, 1, 1, −3, −3, −3, 1, −3, −3, 1, −3, −3.

Optionally, a value of φ(n) of the uplink signal base sequence is: −1, 1, 3, −3, −1, −3, 1, −1, 1, −1, −1, −3.

Optionally, a value of φ(n) of the uplink signal base sequence is: 3, 3, 1, 1, 1, 3, −3, 1, −3, 1, −1, 3.

Optionally, a value of φ(n) of the uplink signal base sequence is: 1, −3, −3, −3, 1, 1, 1, −3, 1, 1, −3, 1.

Optionally, a value of φ(n) of the uplink signal base sequence is: −3, −1, 3, −3, −1, 1, 1, 1, −1, −3, 1, −1.

Optionally, a value of φ(n) of the uplink signal base sequence is: 3, 1, 1, −1, −3, 3, −1, 3, −3, −1, −1, 1.

Optionally, a value of φ(n) of the uplink signal base sequence is: −3, 3, −1, −3, 3, 1, 1, 1, 3, −3, 1, 3.

Optionally, a value of φ(n) of the uplink signal base sequence is: 1, −3, 3, −1, 3, −1, 1, 3, 3, 3, 1, 1.

Optionally, a value of φ(n) of the uplink signal base sequence is: −3, −3, −3, −3, −3, 1, −1, 3, 3, −1, 1, 3.

Optionally, a value of φ(n) of the uplink signal base sequence is: −3, −3, −3, −3, 1, −3, 1, 1, −3, −3, 1, 1.

Optionally, a value of φ(n) of the uplink signal base sequence is: −3, −3, −1, −1, 3, 3, 1, 1, −3, 1, −3, 1.

Optionally, a value of φ(n) of the uplink signal base sequence is: −1, −1, −1, −1, −1, 3, −3, 1, 1, −3, 3, −1.

Optionally, a value of φ(n) of the uplink signal base sequence is: 1, −3, −1, 3, −1, 3, 1, −1, −1, −1, 1, 1.

Optionally, a value of φ(n) of the uplink signal base sequence is: 1, 3, −1, 1, 3, 3, 3, 1, −1, −3, 1, −1.

Optionally, a value of φ(n) of the uplink signal base sequence is: −3, −1, 1, 3, −3, 3, 3, 1, 3, 1, −3, 3.

Optionally, a value of φ(n) of the uplink signal base sequence is: 1, −3, 3, −1, 3, −3, −1, −1, −1, −1, −3, −3.

Optionally, a value of φ(n) of the uplink signal base sequence is: −3, 3, 1, 3, 1, −1, 1, 3, 1, 3, −3, 3.

Optionally, a value of φ(n) of the uplink signal base sequence is: −3, −3, −1, −1, −1, −3, 3, −1, 3, −1, 1, −3.

Optionally, a value of φ(n) of the uplink signal base sequence is: −3, −3, 3, 1, −3, −3, −3, −1, 3, −1, 1, 3.

Optionally, a value of φ(n) of the uplink signal base sequence is: 1, 1, −1, −3, −3, −1, 1, 3, −1, 3, 1, −3.

Optionally, a value of φ(n) of the uplink signal base sequence is: −3, 1, −1, −3, 3, 3, 3, −3, −3, −1, 3, −3.

Optionally, a value of φ(n) of the uplink signal base sequence is: 3, 1, 1, −1, 3, 1, −3, 1, 3, −3, −1, 3, −3, −1.

Optionally, a value of φ(n) of the uplink signal base sequence is: 1, 11, 3, 3, −1, −3, 1, 3, −1, −1, −3, −3.

Optionally, a value of φ(n) of the uplink signal base sequence is: −1, −1, −1, −1, 1, −3, −1, 3, 3, −1, −3, 1.

Optionally, a value of φ(n) of the uplink signal base sequence is: 3, 1, 3, −3, 3, −3, −1, −3, 3, −3, 3, 1.

In a second aspect, a terminal is further provided, including: a memory, a processor, a transceiver, and a program stored in the memory and executable on the processor, where the program is executed by the processor to perform the method of generating an uplink signal sequence hereinabove.

In a third aspect, a base station is further provided, including: a memory, a processor, a transceiver, and a program stored in the memory and executable on the processor, where the program is executed by the processor to perform the method of generating an uplink signal sequence hereinabove.

In a fourth aspect, a computer-readable storage medium storing a program is further provided, where the program is executed by a processor to perform the method of generating an uplink signal sequence hereinabove.

According to the embodiments of the present disclosure, a new phase value combination is introduced for generating the uplink signal base sequence, so as to reduce a peak-to-average power ratio and a correlation between sequences, thereby improving a signal transmission performance and reducing an interference between different sequences of cells.

DETAILED DESCRIPTION

In order to explain the technical solution of the embodiments of the present disclosure more clearly, the drawings used in the embodiments of the present disclosure will be briefly introduced below. Obviously, the drawings in the following description are only some embodiments of the present disclosure. Those skilled in the art may also obtain other drawings according to these drawings without creative work.

The term "and/or" in this document is only an association relationship describing related objects, which means that there can may three kinds of relationships, for example, A and/or B may mean: A exists alone, or A and B exist at the same time, or B exists alone.

The terms "first" and "second" in the specification and claims of the embodiments of the present disclosure are configured to distinguish different objects, rather than to describe a specific order of the objects. For example, the first configuration information and the second configuration information are configured to distinguish different configuration information, rather than to describe a specific order of the configuration information.

In the embodiments of the present disclosure, words such as "exemplary" or "for example" are used as examples, illustrations. Embodiment or design described as "exemplary" or "for example" in the embodiments of the present disclosure should not be construed as more optional or advantageous than other embodiments or designs. Rather, the use of the words "exemplary" or "for example" is intended to present the relevant concept in a concrete manner.

In the description of the embodiments of the present disclosure, unless otherwise stated, the meaning of "plurality" means two or more. For example, multiple processing units refer to two or more processing units; multiple systems refer to two or more systems.

Figure 1:
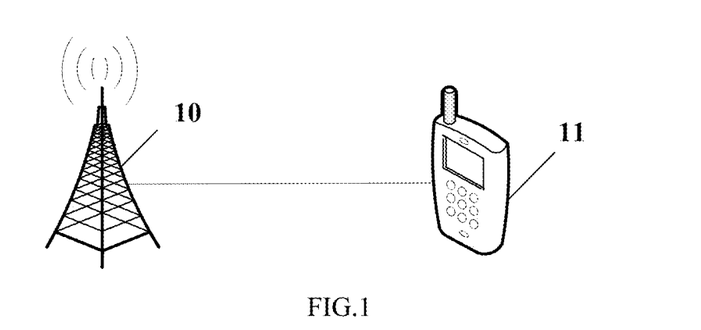
FIG. 1 is a system architecture diagram of a wireless communication system in an embodiment of the present disclosure.

The method of generating an uplink signal sequence, the base station and the terminal provided in the embodiments of the present disclosure may be applied to a wireless communication system. The wireless communication system may be a system adopting a 5th generation (5G) mobile communication technology (hereinafter referred to as a 5G system). Referring to FIG. 1, a schematic diagram of a wireless communication system in an embodiment of the present disclosure is provided. As shown in FIG. 1, the wireless communication system may include a network device 10 and a UE 11, and the UE 11 may communicate with the network device 10. In practical applications, the connection between the foregoing devices may be a wireless connection. In order to conveniently and intuitively represent the connection relationship between the various devices, a solid line is used in FIG. 1 for illustration.

It should be noted that the above communication system may include multiple UEs, and network equipment may communicate with multiple UEs (transmit signaling or transmit data).

Figure 2:
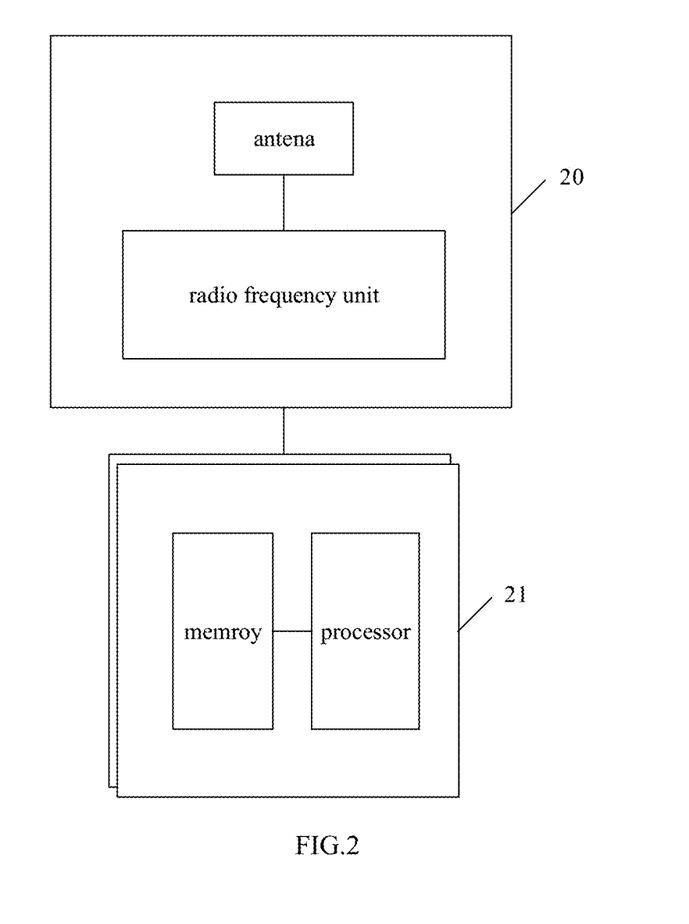
FIG. 2 is a schematic view of a base station in an embodiment of the present disclosure.

The network device provided in the embodiment of the present disclosure may be a base station, and the network device may be a commonly used base station, an evolved base station (eNB), or a network device in a 5G system (for example, the next generation) Base station (next generation node base station, gNB) or transmission and reception point (transmission and reception point (TRP)) and other equipment. Exemplarily, the embodiment of the present disclosure introduces a hardware structure of a network device by using a commonly used base station as an example. Each component of the base station provided in the embodiment of the present disclosure is described in detail below with reference to FIG. 2. As shown in FIG. 2, the base station provided in the embodiment of the present disclosure may include: part 20 and part 21. The part 20 is mainly used for receiving and transmitting of radio frequency signals and conversion of radio frequency signals and baseband signals. The part 21 is mainly used for baseband processing and controlling base stations. The part 20 may be generally called a transceiver unit, a transceiver, a transceiver circuit, or a transceiver. The part 21 is usually the control center of the base station, which may usually be called a processing unit, which is configured to control the base station to perform the steps performed on the base station (i.e., the serving base station) in FIG. For details, reference may be made to the description of the relevant part above.

The transceiver unit of the part 20 may also be called a transceiver or a transceiver, which includes an antenna and a radio frequency unit. The radio frequency unit is mainly used for radio frequency processing. Optionally, the device configured to implement the receiving function in part 20 may be regarded as a receiving unit and the device configured to implement the transmitting function may be regarded as a transmitting unit, that is, the part 20 includes a receiving unit and a transmitting unit. The receiving unit may also be called a receiver, or a receiving circuit, and the transmitting unit may be called a transmitter, or a transmitting circuit.

The part 21 may include one or more single boards, and each single board may include one or more processors and one or more memories. The processors are configured to read and execute programs in the memory to implement baseband processing functions and control the base station. If there are multiple boards, the boards may be interconnected to increase processing capacity. As an optional implementation manner, multiple single boards may share one or more processors, or multiple single boards may share one or more memories, or multiple single boards may share one or more processes at the same time. The memory and the processor may be integrated together or may be independent. In some embodiments of the present disclosure, the part 20 and part 21 may be integrated together or may be provided independently. In addition, all functions in part 21 may be implemented in one chip, or part of the functions may be integrated in one chip, and other functions may be implemented in one or more other chips, which is not limited herein.

The UE provided in the embodiments of the present disclosure may be a mobile phone, a tablet computer, a notebook computer, an ultra-mobile personal computer (UMPC), a netbook, or a personal digital assistant (PDA).

Figure 3:
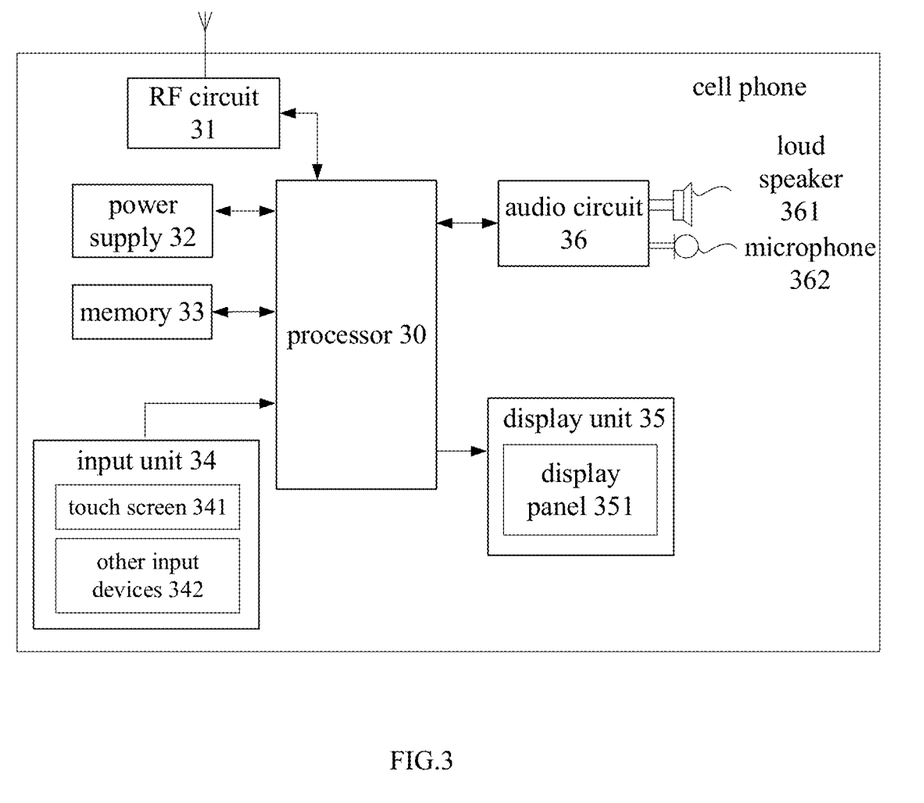
FIG. 3 is a schematic view of a mobile phone in an embodiment of the present disclosure.

Exemplarily, the embodiment of the present disclosure uses the UE as a mobile phone as an example to introduce the hardware structure of the UE. Each component of the mobile phone provided in the embodiment of the present disclosure is described in detail below with reference to FIG. 3. As shown in FIG. 3, the mobile phone provided in the embodiment of the present disclosure includes components such as a processor 30, a radio frequency (RF) circuit 31, a power source 32, a memory 33, an input unit 34, a display unit 35, and an audio circuit 36. Those skilled in the art may understand that the structure of the mobile phone shown in FIG. 3 does not constitute a limitation on the mobile phone, and may include more or fewer parts such as those shown in FIG. 3, or may be combined with some components of the components as shown in FIG. 3, or the component arrangement may be different from the component arrangement shown in FIG. 3.

The processor 30 is a control center of the mobile phone, and uses various interfaces and lines to connect various parts of the entire mobile phone. By running or executing software programs and/or modules stored in the memory 33, and calling data stored in the memory 33, various functions of the mobile phone and processing data are executed, thereby overall monitoring of the mobile phone. Optionally, the processor 30 may include one or more processing units. Optionally, the processor 30 may integrate an application processor and a modem processor, wherein the application processor mainly processes an operating system, a user interface, and an application program; the modem processor mainly processes wireless communications. It may be understood that the aforementioned modem processor may also be a processor that exists independent from the processor 30.

The RF circuit 31 may be configured to receive and send signals during information transmission or communication. For example, the downlink information of the base station is received and processed by the processor 30; in addition, the uplink data is sent to the base station. Generally, the RF circuit includes, but is not limited to, an antenna, at least one amplifier, a transceiver, a coupler, a low noise amplifier (LNA), and a duplexer. In addition, the mobile phone can also realize wireless communication with other devices in the network through the RF circuit 31. Wireless communication can use any communication standard or protocol, including but not limited to Global System (GSM), General Packet Radio Service (GPRS), code division multiple access (Code Division Multiple Access) access (CDMA), wideband code division multiple access (WCDMA), LTE, email, and short message service (SMS).

The power source 32 may be configured to power various components of the mobile phone, and the power source 32 may be a battery. Optionally, the power supply may be logically connected to the processor 30 through the power management system, so as to implement functions such as management of charging, discharging, and power consumption management through the power management system.

The memory 33 may be configured to store software programs and/or modules. The processor 30 executes various functional applications and data processing of the mobile phone by running the software programs and/or modules stored in the memory 33. The memory 33 may mainly include a storage program area and a storage data area, wherein the storage program area may store an operating system, at least one application required by a function (such as a sound playback function, an image playback function, etc.); the storage data area may store data according to Data (such as audio data, image data, phone book, etc.) created by the use of mobile phones. In addition, the memory 33 may include a high-speed random access memory, and may further include a non-volatile memory, such as at least one magnetic disk storage device, a flash memory device, or other volatile solid-state storage device.

The input unit 34 may be configured to receive inputted numeric or character information, and generate key signal inputs related to user settings and function control of the mobile phone. Specifically, the input unit 34 may include a touch screen 341 and other input devices 342. The touch screen 341, also known as a touch panel, can collect the user's touch operations on or near it (such as the operation of the user on the touch screen 341 or near the touch screen 341 using any suitable object or accessory such as a finger or a stylus), and A preset program drives the corresponding connected device. Optionally, the touch screen 341 may include two parts: a touch detection device and a touch controller. The touch detection device detects the user's touch position, and detects the signal caused by the touch operation, and transmits the signal to the touch controller; the touch controller receives touch information from the touch detection device, converts it into contact coordinates, and sends To the processor 30, and can receive the command sent by the processor 30 and execute it. In addition, the touch screen 341 may be implemented in various types such as resistive, capacitive, infrared, and surface acoustic wave. The other input devices 342 may include, but are not limited to, one or more of a physical keyboard, function keys (such as a volume control button, a power switch button, etc.), a trackball, a mouse, and a joystick.

The display unit 35 may be configured to display information input by the user or information provided to the user and various menus of the mobile phone. The display unit 35 may include a display panel 351. Optionally, the display panel 351 may be configured in the form of a liquid crystal display (LCD), an organic light-emitting diode (OLED), or the like. Further, the touch screen 341 may cover the display panel 351. When the touch screen 341 detects a touch operation on or near the touch screen 341, the touch screen 341 is transmitted to the processor 30 to determine the type of the touch event, and the processor 30 then displays the touch event on the display panel according to the type of the touch event. Corresponding visual output is provided on the 351. Although in FIG. 3, the touch screen 341 and the display panel 351 are implemented as two separate components to implement the input and output functions of the mobile phone, in some embodiments, the touch screen 341 and the display panel 351 may be integrated to implement the input of the mobile phone. And output functions.

The audio circuit 36, the speaker 361, and the microphone 362 are configured to provide an audio interface between the user and the mobile phone. On the one hand, the audio circuit 36 may transmit the received electrical data converted electrical signal to the speaker 361, and the speaker 361 converts it into a sound signal and outputs it. On the other hand, the microphone 362 converts the collected sound signals into electrical signals, which are received by the audio circuit 36 and converted into audio data, and then the audio data is output to the RF circuit 31 through the processor 30 to be sent to, for example, another mobile phone, or The audio data is output to the memory 33 through the processor 30 for further processing.

Optionally, the mobile phone shown in FIG. 3 may further include various sensors. For example, a gyroscope sensor, a hygrometer sensor, an infrared sensor, and a magnetometer sensor are not described herein.

Optionally, the mobile phone shown in FIG. 3 may further include a Wi-Fi module, a Bluetooth module, and the like, and details are not described herein again.

Figure 4:
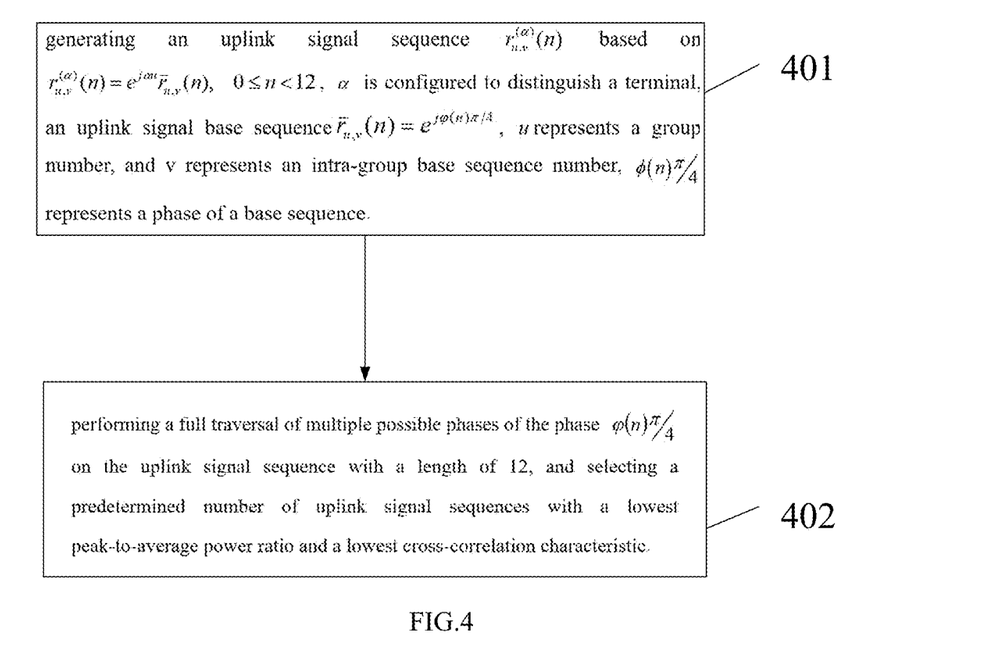
FIG. 4 is a flowchart of a method of generating an uplink signal sequence in an embodiment of the present disclosure.

Referring to FIG. 4, a flowchart of a method of generating an uplink signal sequence is shown. The method is executed by a terminal or a base station. The specific steps are as follows:

Step 401: generating an uplink signal sequence $r_{u,v}^{(\alpha)}(n)$ based on $r_{u,v}^{(\alpha)}(n)=e^{j\alpha n}\bar{r}_{u,v}(n)$, $0 \leq n < 12$, where $\alpha$ is configured to distinguish a terminal, an uplink signal base sequence $\bar{r}_{u,v}(n)=e^{j\varphi(n)\pi/4}$, where u represents a group number, and v represents an intra-group base sequence number, $\varphi(n)\pi/4$ represents a phase of a base sequence;

Step 402: performing a full traversal of multiple possible phases of the phase $\varphi(n)\pi/4$ on the uplink signal sequence with a length of 12, and selecting a predetermined number of uplink signal sequences with a lowest peak-to-average power ratio and a lowest cross-correlation characteristic.

The performing a full traversal of multiple possible phases of the phase $\varphi(n)\pi/4$ on the uplink signal sequence with a length of 12 may include: performing a full traversal of multiple possible phases ($\pi/4$, $-\pi/4$, $3\pi/4$, $-3\pi/4$) of the phase $\varphi(n)\pi/4$ on the uplink signal sequence with a length of 12, to obtain $4^{12}$ candidate uplink signal sequences, and selecting 30 uplink signal sequences with a lowest peak-to-average power ratio and a lowest cross-correlation characteristic.

Embodiment 1

For example: $u \in \{0, 1, \ldots, 29\}$, the value range of $\varphi(n)$ will be described in the following:

Optionally, in the first group, the value of $\varphi(n)$ of the uplink signal base sequence is: −3, 1, −3, 1, −3, −3, 3, 3, −1, −1, 1, 1.

Optionally, in the second group, the value of $\varphi(n)$ of the uplink signal base sequence is: −1, −3, −3, 3, −3, 3, −1, −3, −1, 1, 3, −3.

Optionally, in the third group, the value of $\varphi(n)$ of the uplink signal base sequence is: 3, −1, 3, −1, 3, 3, −1, −1, 3, 3, 3, 3.

Optionally, in the fourth group, the value of φ(n) of the uplink signal base sequence is: −3, 3, −1, −3, −1, −3, −3, 3, −3, −1, 1, 3.

Optionally, in the fifth group, the value of φ(n) of the uplink signal base sequence is: 1, 1, −1, −1, 3, 3, −3, −3, 1, −3, 1, −3.

Optionally, in the sixth group, the value of φ(n) of the uplink signal base sequence is: 1, −3, 1, −3, 1, 1, 3, 3, −1, −1, −3, −3.

Optionally, in Group 7, the value of φ(n) of the uplink signal base sequence is: −1, −3, −1, 1, −1, 1, 3, 1, −1, 1, −1, −3.

Optionally, in the eighth group, the value of φ(n) of the uplink signal base sequence is: 3, −1, 1, −3, −3, 1, −1, 3, 3, 3, 3, 3.

Optionally, in the ninth group, the value of φ(n) of the uplink signal base sequence is: −1, 1, 1, 3, 1, 3, −1, 1, −1, −3, 3, 1.

Optionally, in the 10th group, the value of the φ(n) of the uplink signal base sequence is: 1, 3, −1, 1, −1, 1, 1, 3, 1, −1, −3, 3.

Optionally, in the eleventh group, the value of φ(n) of the uplink signal base

Optionally, in the 12th group, the value of the φ(n) of the uplink signal base sequence is: 3, 3, 1, 1, 1, 1, 3, −3, 1, −3, 3, −1.

Optionally, in the thirteenth group, the value of φ(n) of the uplink signal base sequence is: 1, 1, 1, −3, −3, −3, 1, −3, −3, 1, −3, −3.

Optionally, in the 14th group, the value of φ(n) of the uplink signal base sequence is: −1, 1, 3, −3, −1, −3, 1, −1, 1, −1, −1, −3.

Optionally, in the 15th group, the value of φ(n) of the uplink signal base sequence is: 3, 3, 1, 1, 1, 3, −3, 1, −3, 1, −1, 3.

Optionally, in the 16th group, the value of φ(n) of the uplink signal base sequence is: 1, −3, −3, −3, 1, 1, 1, −3, 1, 1, −3, 1.

Optionally, in the 17th group, the value of φ(n) of the uplink signal base sequence is: −3, −1, 3, −3, −1, 1, 1, 1, −1, −3, 1, −1.

Optionally, in the eighteenth group, the value of φ(n) of the uplink signal base sequence is: 3, 1, 1, −1, −3, 3, −1, 3, −3, −1, −1, 1.

Optionally, in the 19th group, the value of the φ(n) of the uplink signal base sequence is: −3, 3, −1, −3, 3, 1, 1, 1, 3, −3, 1, 3.

Optionally, in the 20th group, the value of φ(n) of the uplink signal base sequence is: 1, −3, 3, −1, 3, −1, 1, 3, 3, 3, 1, 1.

Optionally, in the 21st group, the value of φ(n) of the uplink signal base sequence is: −3, −3, −3, −3, −3, 1, −1, 3, 3, −1, 1, −3.

Optionally, in the 22nd group, the value of φ(n) of the uplink signal base sequence is: −3, −3, −3, −3, 1, −3, 1, 1, −3, −3, 1, 1.

Optionally, in the 23rd group, the value of φ(n) of the uplink signal base sequence is: −3, −3, −1, −1, 3, 3, 1, 1, −3, 1, −3, 1.

Optionally, in the 24th group, the value of φ(n) of the uplink signal base sequence is: −1, −1, −1, −1, −1, 3, −3, 1, 1, 3, 3, −1.

Optionally, in the 25th group, the value of φ(n) of the uplink signal base sequence is: 1, −3, −1, 3, −1, 3, 1, −1, 1, −1, 1, 1.

Optionally, in the 26th group, the value of φ(n) of the uplink signal base sequence is: 1, 3, −1, 1, 3, 3, 3, 1, −1, −3, 1, −1.

Optionally, in the 27th group, the value of φ(n) of the uplink signal base sequence is: −3, −1, 1, 3, −3, 3, 3, 1, 3, 1, −3, 3.

Optionally, in the 28th group, the value of φ(n) of the uplink signal base sequence is: 1, −3, 3, −1, 3, −3, −1, −1, −1, −1, −3, −3.

Optionally, in the group 29, the value of φ(n) of the uplink signal base sequence is: −3, 3, 1, 3, 1, −1, 1, 3, 1, 3, −3, 3.

Optionally, in the 30th group, the value of φ(n) of the uplink signal base sequence is: −3, −3, −1, −1, −1, −3, 3, −1, 3, −1, 1, −3.

The first to 30th groups of φ(n) values of the base sequence of length 12 is shown in Table 2. The base sequence is generated according to the formula: $\bar{r}_{u,v}(n)=e^{j\varphi(n)\pi/4}$, $0 \leq n \leq 11$, $u \in \{0, 1, \ldots, 29\}$ represents the group number.

TABLE 2

Select group 1 to 30

| u | φ(0), . . . , φ(11) |
|---|---|
| 0 | −3, 1, −3, 1, −3, −3, 3, 3, −1, −1, 1, 1 |
| 1 | −1, −3, −3, 3, −3, 3, −1, −3, −1, 1, 3, −3 |
| 2 | 3, −1, 3, −1, 3, 3, −1, −1, 3, 3, 3, 3 |
| 3 | −3, 3, −1, −3, −1, −3, −3, 3, −3, −1, 1, 3 |
| 4 | 1, 1, −1, −1, 3, 3, −3, −3, 1, −3, 1, −3 |
| 5 | 1, −3, 1, −3, 1, 1, 3, 3, −1, −1, −3, −3 |
| 6 | −1, −3, −1, 1, −1, 1, 3, 1, −1, 1, −1, −3 |
| 7 | 3, −1, 1, −3, −3, 1, −1, 3, 3, 3, 3, 3 |
| 8 | −1, 1, 1, 3, 1, 3, −1, 1, −1, −3, 3, 1 |
| 9 | 1, 3, −1, 1, −1, 1, 1, 3, 1, −1, −3, 3 |
| 10 | −1, 3, 1, −3, −3, 1, 3, −1, −1, −1, −1, −1 |
| 11 | 3, 3, 1, 1, 1, 1, 3, −3, 1, −3, 3, −1 |
| 12 | 1, 1, 1, −3, −3, −3, 1, −3, −3, 1, −3, −3 |
| 13 | −1, 1, 3, −3, −1, −3, 1, −1, 1, −1, −1, −3 |
| 14 | 3, 3, 1, 1, 3, −3, 1, −3, 1, −1, 3 |
| 15 | 1, −3, −3, −3, 1, 1, 1, −3, 1, 1, −3, 1 |
| 16 | −3, −1, 3, −3, −1, 1, 1, 1, −1, −3, 1, −1 |
| 17 | 3, 1, 1, −1, −3, 3, −1, 3, −3, −1, −1, 1 |
| 18 | −3, 3, −1, −3, 3, 1, 1, 1, 3, −3, 1, 3 |
| 19 | 1, −3, 3, −1, 3, −1, 1, 3, 3, 3, 1, 1 |
| 20 | −3, −3, −3, −3, −3, 1, −1, 3, 3, −1, 1, −3 |
| 21 | −3, −3, −3, −3, 1, −3, 1, 1, −3, −3, 1, 1 |
| 22 | −3, −3, −1, −1, 3, 3, 1, 1, −3, 1, −3, 1 |
| 23 | −1, −1, −1, −1, −1, 3, −3, 1, 1, 3, 3, −1 |
| 24 | 1, −3, −1, 3, −1, 3, 1, −1, 1, −1, 1, 1 |
| 25 | 1, 3, −1, 1, 3, 3, 3, 1, −1, −3, 1, −1 |
| 26 | −3, −1, 1, 3, −3, 3, 3, 1, 3, 1, −3, 3 |
| 27 | 1, −3, 3, −1, −3, −3, −1, −1, −1, −1, −3, −3 |
| 28 | −3, 3, 1, 3, 1, −1, 1, 3, 1, 3, −3, 3 |
| 29 | −3, −3, −1, −1, −1, −3, 3, −1, 3, −1, 1, −3 |

Embodiment 2

For example: $u \in \{0, 1, \ldots, 29\}$, the value range of φ(n) will be described in the following:

Optionally, in the first group, the value of φ(n) of the uplink signal base sequence is: −3, 1, −3, 1, −3, −3, 3, 3, −1, −1, 1, 1.

Optionally, in the second group, the value of φ(n) of the uplink signal base sequence is: −1, −3, −3, 3, −3, 3, −1, −3, −1, 1, 3, −3.

Optionally, in the third group, the value of φ(n) of the uplink signal base sequence is: 3, −1, 3, −1, 3, 3, −1, −1, 3, 3, 3, 3.

Optionally, in the fourth group, the value of φ(n) of the uplink signal base sequence is: −3, 3, −1, −3, −1, −3, −3, 3, −3, −1, 1, 3.

Optionally, in the fifth group, the value of φ(n) of the uplink signal base sequence is: 1, 1, −1, −1, 3, 3, −3, −3, 1, −3, 1, −3.

Optionally, in the sixth group, the value of φ(n) of the uplink signal base sequence is: 1, −3, 1, −3, 1, 1, 3, 3, −1, −1, −3, −3.

Optionally, in seventh group, the value of φ(n) of the uplink signal base sequence is: −1, −3, −1, 1, −1, 1, 3, 1, −1, 1, −1, −3.

Optionally, in the eighth group, the value of φ(n) of the uplink signal base sequence is: 3, −1, 1, −3, −3, 1, −1, 3, 3, 3, 3, 3.

Optionally, in the ninth group, the value of φ(n) of the uplink signal base sequence is: −1, 1, 1, 3, 1, 3, −1, 1, −1, −3, 3, 1.

Optionally, in the 10th group, the value of the φ(n) of the uplink signal base sequence is: 1, 3, −1, 1, −1, 1, 1, 3, 1, −1, −3, 3.

Optionally, in the eleventh group, the value of φ(n) of the uplink signal base sequence is: −1, 3, 1, −3, −3, 1, 3, −1, −1, −1, −1, −1.

Optionally, in the 12th group, the value of the φ(n) of the uplink signal base sequence is: 3, 3, 1, 1, 1, 1, 3, −3, 1, −3, 3, −1.

Optionally, in the 13th group, the value of φ(n) of the uplink signal base sequence is: −3, −3, 3, 1, −3, −3, −3, −1, 3, −1, 1, 3.

Optionally, in the 14th group, the value of φ(n) of the uplink signal base sequence is: −1, 1, 3, −3, −1, −3, 1, −1, 1, −1, −1, −3.

Optionally, in the 15th group, the value of φ(n) of the uplink signal base sequence is: 3, 3, 1, 1, 1, 3, −3, 1, −3, 1, −1, 3.

Optionally, in the 16th group, the value of φ(n) of the uplink signal base sequence is: 1, −3, −3, −3, 1, 1, 1, −3, 1, 1, −3, 1.

Optionally, in the 17th group, the value of φ(n) of the uplink signal base sequence is: 1, 1, −1, −3, −3, −1, 1, 3, −1, 3, 1, −3.

Optionally, in the eighteenth group, the value of φ(n) of the uplink signal base sequence is: 3, 1, 1, −1, −3, 3, −1, 3, −3, −1, −1, 1.

Optionally, in the 19th group, the value of φ(n) of the uplink signal base sequence is: −3, 3, −1, −3, 3, 1, 1, 1, 3, −3, 1, 3.

Optionally, in the 20th group, the value of φ(n) of the uplink signal base sequence is: 1, −3, 3, −1, 3, −1, 1, 3, 3, 3, 1, 1.

Optionally, in the 21st group, the value of φ(n) of the uplink signal base sequence is: −3, 1, −1, −3, 3, 3, 3, −3, −3, −1, 3, −3.

Optionally, in the 22nd group, the value of φ(n) of the uplink signal base sequence is: −3, −3, −3, −3, 1, −3, 1, 1, −3, −3, 1, 1.

Optionally, in the 23rd group, the value of φ(n) of the uplink signal base sequence is: −3, −3, −1, −1, 3, 3, 1, 1, −3, 1, −3, 1.

Optionally, in the 24th group, the value of φ(n) of the uplink signal base sequence is: 3, 1, 1, −1, 3, 1, −3, 1, 3, −3, −1, −1.

Optionally, in the 25th group, the value of φ(n) of the uplink signal base sequence is: 1, −3, −1, 3, −1, 3, 1, −1, −1, −1, 1, 1.

Optionally, in group 26, the value of φ(n) of the uplink signal base sequence is 1, 1, 3, 3, −1, −3, 1, 3, −1, −1, −3, −3.

Optionally, in the 27th group, the value of φ(n) of the uplink signal base sequence is: −3, −1, 1, 3, −3, 3, 3, 1, 3, 1, −3, 3.

Optionally, in the 28th group, the value of φ(n) of the uplink signal base sequence is: 1, −3, 3, −1, 3, −3, −1, −1, −1, −1, −3, −3.

Optionally, in the 29th group, the value of the φ(n) of the uplink signal base sequence is: −1, −1, −1, −1, 1, −3, −1, 3, 3, −1, −3, 1.

Optionally, in the 30th group, the value of φ(n) of the uplink signal base sequence is: 3, 1, 3, −3, 3, −3, −1, −3, 3, −3, 3, 1.

The first to 30th groups of φ(n) values of the base sequence of length 12 is shown in Table 3. The base sequence is generated according to the formula: $\bar{r}_{u,v}(n)=e^{j\varphi(n)\pi/4}$, $0\leq n\leq 11$, $u\in\{0, 1, \ldots, 29\}$ represents the group number.

TABLE 3 select groups 1 to 30

| u | φ(0), . . . , φ(11) |
|---|---|
| 0 | −3, 1, −3, 1, −3, −3, 3, 3, −1, −1, 1, 1 |
| 1 | −1, −3, −3, 3, −3, 3, −1, −3, −1, 1, 3, −3 |
| 2 | 3, −1, 3, −1, 3, 3, −1, −1, 3, 3, 3, 3 |
| 3 | −3, 3, −1, −3, −1, −3, −3, 3, −3, −1, 1, 3 |
| 4 | 1, 1, −1, −1, 3, 3, −3, −3, 1, −3, 1, −3 |
| 5 | 1, −3, 1, −3, 1, 1, 3, 3, −1, −1, −3, −3 |
| 6 | −1, −3, −1, 1, −1, 1, 3, 1, −1, 1, −1, −3 |
| 7 | 3, −1, 1, −3, −3, 1, −1, 3, 3, 3, 3 |
| 8 | −1, 1, 1, 3, 1, 3, −1, 1, −1, −3, 3, 1 |
| 9 | 1, 3, −1, 1, −1, 1, 1, 3, 1, −1, −3, 3 |
| 10 | −1, 3, 1, −3, −3, 1, 3, −1, −1, −1, −1, −1 |
| 11 | 3, 3, 1, 1, 1, 1, 3, −3, 1, −3, 3, −1 |
| 12 | −3, −3, 3, 1, −3, −3, −3, −1, 3, −1, 1, 3 |
| 13 | −1, 1, 3, −3, −1, −3, 1, −1, 1, −1, −1, −3 |
| 14 | 3, 3, 1, 1, 1, 3, −3, 1, −3, 1, −1, 3 |
| 15 | 1, −3, −3, −3, 1, 1, 1, −3, 1, 1, −3, 1 |
| 16 | 1, 1, −1, −3, −3, −1, 1, 3, −1, 3, 1, −3 |
| 17 | 3, 1, 1, −1, −3, 3, −1, 3, −3, −1, −1, 1 |
| 18 | −3, 3, −1, −3, 3, 1, 1, 1, 3, −3, 1, 3 |
| 19 | 1, −3, 3, −1, 3, −1, 1, 3, 3, 3, 1, 1 |
| 20 | −3, 1, −1, −3, 3, 3, 3, −3, −3, −1, 3, −3 |
| 21 | −3, −3, −3, −3, 1, −3, 1, 1, −3, −3, 1, 1 |
| 22 | −3, −3, −1, −1, 3, 3, 1, 1, −3, 1, −3, 1 |
| 23 | 3, 1, 1, −1, 3, 1, −3, 1, 3, −3, −1, −1 |
| 24 | 1, −3, −1, 3, −1, 3, 1, −1, −1, −1, 1, 1 |
| 25 | 1, 1, 3, 3, −1, −3, 1, 3, −1, −1, −3, −3 |
| 26 | −3, −1, 1, 3, −3, 3, 3, 1, 3, 1, −3, 3 |
| 27 | 1, −3, 3, −1, −3, −3, −1, −1, −1, −1, −3, −3 |
| 28 | −1, −1, −1, −1, 1, −3, −1, 3, 3, −1, −3, 1 |
| 29 | 3, 1, 3, −3, 3, −3, −1, −3, 3, −3, 3, 1 |

According to the embodiments of the present disclosure, a new phase value combination is introduced for generating the uplink signal base sequence, so as to reduce a peak-to-average power ratio and a correlation between sequences, thereby improving a signal transmission performance and reducing an interference between different sequences of cells.

A user equipment is further provided in the embodiments of the present disclosure. Since the principle of the terminal to solve the problem is similar to the method of generating an uplink signal sequence in the embodiment of the present disclosure, implementation of the terminal may refer to the implementation of the method, and the details there of will not be described again.

Figure 5:
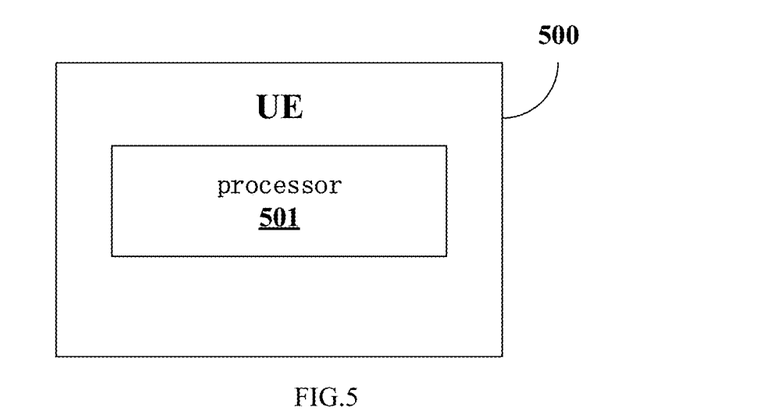
FIG. 5 is a first schematic view of a UE in an embodiment of the present disclosure.

FIG. 5 is a schematic view of a UE in an embodiment of the present disclosure. The UE 500 includes a processor 501. The processor 501 is configured to:

generate an uplink signal sequence $r_{u,v}^{(\alpha)}(n)$ based on $r_{u,v}^{(\alpha)}(n)=e^{j\alpha n}\bar{r}_{u,v}(n)$, $0\le n<12$, where α is configured to distinguish a terminal, an uplink signal base sequence $\bar{r}_{u,v}(n)=e^{j\varphi(n)\pi/4}$, where u represents a group number, and v represents an intra-group base sequence number, $\varphi(n)\pi/4$ represents a phase of a base sequence.

The processor 501 is further configured to: perform a full traversal of multiple possible phases of the phase $\varphi(n)\pi/4$ on the uplink signal sequence with a length of 12, and select a predetermined number of uplink signal sequences with a lowest peak-to-average power ratio and a lowest cross-correlation characteristic.

The performing a full traversal of multiple possible phases of the phase $\varphi(n)\pi/4$ on the uplink signal sequence with a length of 12 may include: performing a full traversal of multiple possible phases ($\pi/4$, $-\pi/4$, $3\pi/4$, $-3\pi/4$) of the phase $\varphi(n)\pi/4$ on the uplink signal sequence with a length of 12, to obtain $4^{12}$ candidate uplink signal sequences, and selecting 30 uplink signal sequences with a lowest peak-to-average power ratio and a lowest cross-correlation characteristic.

Embodiment 1

For example: $u\in\{0, 1, \ldots, 29\}$, the value range of $\varphi(n)$ will be described in the following:

Optionally, in the first group, the value of $\varphi(n)$ of the uplink signal base sequence is: −3, 1, −3, 1, −3, −3, 3, 3, −1, −1, 1, 1.

Optionally, in the second group, the value of $\varphi(n)$ of the uplink signal base sequence is: −1, −3, −3, 3, −3, 3, −1, −3, −1, 1, 3, −3.

Optionally, in the third group, the value of $\varphi(n)$ of the uplink signal base sequence is: 3, −1, 3, −1, 3, 3, −1, −1, 3, 3, 3, 3.

Optionally, in the fourth group, the value of $\varphi(n)$ of the uplink signal base sequence is: −3, 3, −1, −3, −1, −3, −3, 3, −3, −1, 1, 3.

Optionally, in the fifth group, the value of $\varphi(n)$ of the uplink signal base sequence is: 1, 1, −1, −1, 3, 3, −3, −3, 1, −3, 1, −3.

Optionally, in the sixth group, the value of $\varphi(n)$ of the uplink signal base sequence is: 1, −3, 1, −3, 1, 1, 3, 3, −1, −1, −3, −3.

Optionally, in Group 7, the value of $\varphi(n)$ of the uplink signal base sequence is: −1, −3, −1, 1, −1, 1, 3, 1, −1, 1, −1, −3.

Optionally, in the eighth group, the value of $\varphi(n)$ of the uplink signal base sequence is: 3, −1, 1, −3, −3, 1, −1, 3, 3, 3, 3, 3.

Optionally, in the ninth group, the value of $\varphi(n)$ of the uplink signal base sequence is: −1, 1, 1, 3, 1, 3, −1, 1, −1, −3, 3, 1.

Optionally, in the 10th group, the value of the $\varphi(n)$ of the uplink signal base sequence is: 1, 3, −1, 1, −1, 1, 1, 3, 1, −1, −3, 3.

Optionally, in the eleventh group, the value of $\varphi(n)$ of the uplink signal base Optionally, in the 12th group, the value of the $\varphi(n)$ of the uplink signal base sequence is: 3, 3, 1, 1, 1, 3, −3, 1, −3, 3, −1.

Optionally, in the thirteenth group, the value of $\varphi(n)$ of the uplink signal base sequence is: 1, 1, 1, −3, −3, −3, 1, −3, −3, 1, −3, −3.

Optionally, in the 14th group, the value of $\varphi(n)$ of the uplink signal base sequence is: −1, 1, 3, −3, −1, −3, 1, −1, 1, −1, −1, −3.

Optionally, in the 15th group, the value of $\varphi(n)$ of the uplink signal base sequence is: 3, 3, 1, 1, 1, 3, −3, 1, −3, 1, −1, 3.

Optionally, in the 16th group, the value of $\varphi(n)$ of the uplink signal base sequence is: 1, −3, −3, −3, 1, 1, 1, −3, 1, 1, −3, 1.

Optionally, in the 17th group, the value of $\varphi(n)$ of the uplink signal base sequence is: −3, −1, 3, −3, −1, 1, 1, 1, −1, −3, 1, −1.

Optionally, in the eighteenth group, the value of $\varphi(n)$ of the uplink signal base sequence is: 3, 1, 1, −1, −3, 3, −1, 3, −3, −1, −1, 1.

Optionally, in the 19th group, the value of the $\varphi(n)$ of the uplink signal base sequence is: −3, 3, −1, −3, 3, 1, 1, 1, 3, −3, 1, 3.

Optionally, in the 20th group, the value of $\varphi(n)$ of the uplink signal base sequence is: 1, −3, 3, −1, 3, −1, 1, 3, 3, 3, 1, 1.

Optionally, in the 21st group, the value of $\varphi(n)$ of the uplink signal base sequence is: −3, −3, −3, −3, −3, 1, −1, 3, 3, −1, 1, −3.

Optionally, in the 22nd group, the value of $\varphi(n)$ of the uplink signal base sequence is: −3, −3, −3, −3, 1, −3, 1, 1, −3, −3, 1, 1.

Optionally, in the 23rd group, the value of $\varphi(n)$ of the uplink signal base sequence is: −3, −3, −1, −1, 3, 3, 1, 1, −3, 1, −3, 1.

Optionally, in the 24th group, the value of $\varphi(n)$ of the uplink signal base sequence is: −1, −1, −1, −1, −1, 3, −3, 1, 1, 3, 3, −1.

Optionally, in the 25th group, the value of $\varphi(n)$ of the uplink signal base sequence is: 1, −3, −1, 3, −1, 3, 1, −1, −1, −1, 1, 1.

Optionally, in the 26th group, the value of $\varphi(n)$ of the uplink signal base sequence is: 1, 3, −1, 1, 3, 3, 3, 1, −1, −3, 1, −1.

Optionally, in the 27th group, the value of $\varphi(n)$ of the uplink signal base sequence is: −3, −1, 1, 3, −3, 3, 3, 1, 3, 1, −3, 3.

Optionally, in the 28th group, the value of $\varphi(n)$ of the uplink signal base sequence is: 1, −3, 3, −1, 3, −3, −1, −1, −1, −1, −3, −3.

Optionally, in the group 29, the value of $\varphi(n)$ of the uplink signal base sequence is: −3, 3, 1, 3, 1, −1, 1, 3, 1, 3, −3, 3.

Optionally, in the 30th group, the value of $\varphi(n)$ of the uplink signal base sequence is: −3, −3, −1, −1, −1, −3, 3, −1, 3, −1, 1, −3.

Embodiment 2

For example: $u\in\{0, 1, \ldots, 29\}$, the value range of $\varphi(n)$ will be described in the following:

Optionally, in the first group, the value of $\varphi(n)$ of the uplink signal base sequence is: −3, 1, −3, 1, −3, −3, 3, 3, −1, −1, 1, 1.

Optionally, in the second group, the value of $\varphi(n)$ of the uplink signal base sequence is: −1, −3, −3, 3, −3, 3, −1, −3, −1, 1, 3, −3.

Optionally, in the third group, the value of $\varphi(n)$ of the uplink signal base sequence is: 3, −1, −1, 3, 3, −1, −1, 3, 3, 3, 3.

Optionally, in the fourth group, the value of $\varphi(n)$ of the uplink signal base sequence is: −3, 3, −1, −3, −1, −3, −3, 3, −3, −1, 1, 3.

Optionally, in the fifth group, the value of $\varphi(n)$ of the uplink signal base sequence is: 1, 1, −1, −1, 3, 3, −3, −3, 1, −3, 1, −3.

Optionally, in the sixth group, the value of φ(n) of the uplink signal base sequence is: 1, −3, 1, −3, 1, 1, 3, 3, −1, −1, −3, −3.

Optionally, in seventh group, the value of φ(n) of the uplink signal base sequence is: −1, −3, −1, 1, −1, 1, 3, 1, −1, 1, −1, −3.

Optionally, in the eighth group, the value of φ(n) of the uplink signal base sequence is: 3, −1, 1, −3, −3, 1, −1, 3, 3, 3, 3, 3.

Optionally, in the ninth group, the value of φ(n) of the uplink signal base sequence is: −1, 1, 1, 3, 1, 3, −1, 1, −1, −3, 3, 1.

Optionally, in the 10th group, the value of the φ(n) of the uplink signal base sequence is: 1, 3, −1, 1, −1, 1, 1, 3, 1, −1, −3, 3.

Optionally, in the eleventh group, the value of φ(n) of the uplink signal base sequence is: −1, 3, 1, −3, −3, 1, 3, −1, −1, −1, −1, −1.

Optionally, in the 12th group, the value of the φ(n) of the uplink signal base sequence is: 3, 3, 1, 1, 1, 1, 3, −3, 1, −3, 3, −1.

Optionally, in the 13th group, the value of φ(n) of the uplink signal base sequence is: −3, −3, 3, 1, −3, −3, −3, −1, 3, −1, 1, 3.

Optionally, in the 14th group, the value of φ(n) of the uplink signal base sequence is: −1, 1, 3, −3, −1, −3, 1, −1, 1, −1, −1, −3.

Optionally, in the 15th group, the value of φ(n) of the uplink signal base sequence is: 3, 3, 1, 1, 1, 3, −3, 1, −3, 1, −1, 3.

Optionally, in the 16th group, the value of φ(n) of the uplink signal base sequence is: 1, −3, −3, −3, 1, 1, 1, −3, 1, 1, −3, 1.

Optionally, in the 17th group, the value of φ(n) of the uplink signal base sequence is: 1, 1, −1, −3, −3, −1, 1, 3, −1, 3, 1, −3

Optionally, in the eighteenth group, the value of φ(n) of the uplink signal base sequence is: 3, 1, 1, −1, −3, 3, −1, 3, −3, −1, −1, 1.

Optionally, in the 19th group, the value of φ(n) of the uplink signal base sequence is: −3, 3, −1, −3, 3, 1, 1, 1, 3, −3, 1, 3.

Optionally, in the 20th group, the value of φ(n) of the uplink signal base sequence is: 1, −3, 3, −1, 3, −1, 1, 3, 3, 1, 1.

Optionally, in the 21st group, the value of φ(n) of the uplink signal base sequence is: −3, 1, −1, −3, 3, 3, 3, −3, −3, −1, 3, −3.

Optionally, in the 22nd group, the value of φ(n) of the uplink signal base sequence is: −3, −3, −3, −3, 1, −3, 1, 1, −3, −3, 1, 1.

Optionally, in the 23rd group, the value of φ(n) of the uplink signal base sequence is: −3, −3, −1, −1, 3, 3, 1, 1, −3, 1, −3, 1.

Optionally, in the 24th group, the value of φ(n) of the uplink signal base sequence is: 3, 1, 1, −1, 3, 1, −3, 1, 3, −3, −1, −1.

Optionally, in the 25th group, the value of φ(n) of the uplink signal base sequence is: 1, −3, −1, 3, −1, 3, 1, −1, −1, −1, 1, 1.

Optionally, in group 26, the value of φ(n) of the uplink signal base sequence is 1, 1, 3, 3, −1, −3, 1, 3, −1, −1, −3, −3.

Optionally, in the 27th group, the value of φ(n) of the uplink signal base sequence is: −3, −1, 1, 3, −3, 3, 3, 1, 3, 1, −3, 3.

Optionally, in the 28th group, the value of φ(n) of the uplink signal base sequence is: 1, −3, 3, −1, 3, −3, −1, −1, −1, −1, −3, −3.

Optionally, in the 29th group, the value of the φ(n) of the uplink signal base sequence is: −1, −1, −1, −1, 1, −3, −1, 3, 3, −1, −3, 1.

Optionally, in the 30th group, the value of φ(n) of the uplink signal base sequence is: 3, 1, 3, −3, 3, −3, −1, −3, 3, −3, 3, 1.

The terminal provided in this embodiment may execute the foregoing method embodiments, and the implementation principles and technical effects are similar, which will not be described herein again.

A base station is further provided in an embodiment of the present disclosure. Since the principle of solving the issues of the base station is similar to the method of generating an uplink signal sequence in the embodiment of the present disclosure, implementation of the base station may refer to the implementation of the method, and the detailed description are not described again.

Figure 6:
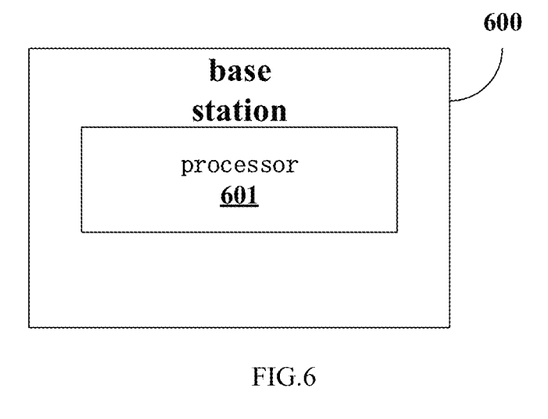
FIG. 6 is a first schematic view of a base station in an embodiment of the present disclosure.

FIG. 6 is a schematic view of a base station in an embodiment of the present disclosure. The base station 600 includes a processor 601. The processor 601 is configured to:

generate an uplink signal sequence $r_{u,v}^{(\alpha)}(n)$ based on $r_{u,v}^{(\alpha)}(n) = e^{j\alpha n} \bar{r}_{u,v}(n)$, 0≤n<12, where α is configured to distinguish a terminal, an uplink signal base sequence $\bar{r}_{u,v}(n) = e^{j\varphi(n)\pi/4}$, where u represents a group number, and v represents an intra-group base sequence number, φ(n)π/4 represents a phase of a base sequence.

The processor 601 is further configured to: perform a full traversal of multiple possible phases of the phase φ(n)π/4 on the uplink signal sequence with a length of 12, and select a predetermined number of uplink signal sequences with a lowest peak-to-average power ratio and a lowest cross-correlation characteristic.

The performing a full traversal of multiple possible phases of the phase φ(n)π/4 on the uplink signal sequence with a length of 12 may include: performing a full traversal of multiple possible phases (π/4, −π/4, 3π/4, −3π/4) of the phase φ(n) on the uplink signal sequence with a length of 12, to obtain $4^{12}$ candidate uplink signal sequences, and selecting 30 uplink signal sequences with a lowest peak-to-average power ratio and a lowest cross-correlation characteristic.

Embodiment 1

For example: u∈{0, 1, . . . , 29}, the value range of φ(n) will be described in the following:

Optionally, in the first group, the value of φ(n) of the uplink signal base sequence is: −3, 1, −3, 1, −3, −3, 3, 3, −1, −1, 1, 1.

Optionally, in the second group, the value of φ(n) of the uplink signal base sequence is: −1, −3, −3, 3, −3, 3, −1, −3, −1, 1, 3, −3.

Optionally, in the third group, the value of φ(n) of the uplink signal base sequence is: 3, −1, 3, −1, 3, 3, −1, −1, 3, 3, 3, 3.

Optionally, in the fourth group, the value of φ(n) of the uplink signal base sequence is: −3, 3, −1, −3, −1, −3, −3, 3, −3, −1, 1, 3.

Optionally, in the fifth group, the value of φ(n) of the uplink signal base sequence is: 1, 1, −1, −1, 3, 3, −3, −3, 1, −3, 1, −3.

Optionally, in the sixth group, the value of φ(n) of the uplink signal base sequence is: 1, −3, 1, −3, 1, 1, 3, 3, −1, −1, −3, −3.

Optionally, in Group 7, the value of φ(n) of the uplink signal base sequence is: −1, −3, −1, 1, −1, 1, 3, 1, −1, 1, −1, −3.

Optionally, in the eighth group, the value of φ(n) of the uplink signal base sequence is: 3, −1, 1, −3, −3, 1, −1, 3, 3, 3, 3, 3.

Optionally, in the ninth group, the value of φ(n) of the uplink signal base sequence is: −1, 1, 1, 3, 1, 3, −1, 1, −1, −3, 3, 1.

Optionally, in the 10th group, the value of the φ(n) of the uplink signal base sequence is: 1, 3, −1, 1, −1, 1, 1, 3, 1, −1, −3, 3.

Optionally, in the eleventh group, the value of φ(n) of the uplink signal base

Optionally, in the 12th group, the value of the φ(n) of the uplink signal base sequence is: 3, 3, 1, 1, 1, 1, 3, −3, 1, −3, 3, −1.

Optionally, in the thirteenth group, the value of φ(n) of the uplink signal base sequence is: 1, 1, 1, −3, −3, −3, 1, −3, −3, 1, −3, −3.

Optionally, in the 14th group, the value of φ(n) of the uplink signal base sequence is: −1, 1, 3, −3, −1, −3, 1, −1, 1, −1, −1, −3.

Optionally, in the 15th group, the value of φ(n) of the uplink signal base sequence is: 3, 3, 1, 1, 1, 3, −3, 1, −3, 1, −1, 3.

Optionally, in the 16th group, the value of φ(n) of the uplink signal base sequence is: 1, −3, −3, −3, 1, 1, 1, −3, 1, 1, −3, 1.

Optionally, in the 17th group, the value of φ(n) of the uplink signal base sequence is: −3, −1, 3, −3, −1, 1, 1, 1, −1, −3, 1, −1.

Optionally, in the eighteenth group, the value of φ(n) of the uplink signal base sequence is: 3, 1, 1, −1, −3, 3, −1, 3, −3, −1, −1, 1.

Optionally, in the 19th group, the value of the φ(n) of the uplink signal base sequence is: −3, 3, −1, −3, 3, 1, 1, 1, 3, −3, 1, 3.

Optionally, in the 20th group, the value of φ(n) of the uplink signal base sequence is: 1, −3, 3, −1, 3, −1, 1, 3, 3, 3, 1, 1.

Optionally, in the 21st group, the value of φ(n) of the uplink signal base sequence is: −3, −3, −3, −3, −3, 1, −1, 3, 3, −1, 1, −3.

Optionally, in the 22nd group, the value of φ(n) of the uplink signal base sequence is: −3, −3, −3, −3, 1, −3, 1, 1, −3, −3, 1, 1.

Optionally, in the 23rd group, the value of φ(n) of the uplink signal base sequence is: −3, −3, −1, −1, 3, 3, 1, 1, −3, 1, −3, 1.

Optionally, in the 24th group, the value of φ(n) of the uplink signal base sequence is: −1, −1, −1, −1, −1, 3, −3, 1, 1, 3, 3, −1.

Optionally, in the 25th group, the value of φ(n) of the uplink signal base sequence is: 1, −3, −1, 3, −1, 3, 1, −1, −1, −1, 1, 1.

Optionally, in the 26th group, the value of φ(n) of the uplink signal base sequence is: 1, 3, −1, 1, 3, 3, 3, 1, −1, −3, 1, −1.

Optionally, in the 27th group, the value of φ(n) of the uplink signal base sequence is: −3, −1, 1, 3, −3, 3, 3, 1, 3, 1, −3, 3.

Optionally, in the 28th group, the value of φ(n) of the uplink signal base sequence is: 1, −3, 3, −1, 3, −3, −1, −1, −1, −1, −3, −3.

Optionally, in the group 29, the value of φ(n) of the uplink signal base sequence is: −3, 3, 1, 3, 1, −1, 1, 3, 1, 3, −3, 3.

Optionally, in the 30th group, the value of φ(n) of the uplink signal base sequence is: −3, −3, −1, −1, −1, −3, 3, −1, 3, −1, 1, −3.

Embodiment 2

For example: u∈{0, 1, . . . , 29}, the value range of φ(n) will be described in the following:

Optionally, in the first group, the value of φ(n) of the uplink signal base sequence is: −3, 1, −3, 1, −3, −3, 3, 3, −1, −1, 1, 1.

Optionally, in the second group, the value of φ(n) of the uplink signal base sequence is: −1, −3, −3, 3, −3, 3, −1, −3, −1, 1, 3, −3.

Optionally, in the third group, the value of φ(n) of the uplink signal base sequence is: 3, −1, 3, −1, 3, 3, −1, −1, 3, 3, 3, 3.

Optionally, in the fourth group, the value of φ(n) of the uplink signal base sequence is: −3, 3, −1, −3, −1, −3, −3, 3, −3, −1, 1, 3.

Optionally, in the fifth group, the value of φ(n) of the uplink signal base sequence is: 1, 1, −1, −1, 3, 3, −3, −3, 1, −3, 1, −3.

Optionally, in the sixth group, the value of φ(n) of the uplink signal base sequence is: 1, −3, 1, −3, 1, 1, 3, 3, −1, −1, −3, −3.

Optionally, in seventh group, the value of φ(n) of the uplink signal base sequence is: −1, −3, −1, 1, −1, 1, 3, 1, −1, 1, −1, −3.

Optionally, in the eighth group, the value of φ(n) of the uplink signal base sequence is: 3, −1, 1, −3, −3, 1, −1, 3, 3, 3, 3, 3.

Optionally, in the ninth group, the value of φ(n) of the uplink signal base sequence is: −1, 1, 1, 3, 1, 3, −1, 1, −1, −3, 3, 1.

Optionally, in the 10th group, the value of the φ(n) of the uplink signal base sequence is: 1, 3, −1, 1, −1, 1, 1, 3, 1, −1, −3, 3.

Optionally, in the eleventh group, the value of φ(n) of the uplink signal base sequence is: −1, 3, 1, −3, −3, 1, 3, −1, −1, −1, −1, −1.

Optionally, in the 12th group, the value of the φ(n) of the uplink signal base sequence is: 3, 3, 1, 1, 1, 1, 3, −3, 1, −3, 3, −1.

Optionally, in the 13th group, the value of φ(n) of the uplink signal base sequence is: −3, −3, 3, 1, −3, −3, −3, −1, 3, −1, 1, 3.

Optionally, in the 14th group, the value of φ(n) of the uplink signal base sequence is: −1, 1, 3, −3, −1, −3, 1, −1, 1, −1, −1, −3.

Optionally, in the 15th group, the value of φ(n) of the uplink signal base sequence is: 3, 3, 1, 1, 1, 3, −3, 1, −3, 1, −1, 3.

Optionally, in the 16th group, the value of φ(n) of the uplink signal base sequence is: 1, −3, −3, −3, 1, 1, 1, −3, 1, 1, −3, 1.

Optionally, in the 17th group, the value of φ(n) of the uplink signal base sequence is: 1, 1, −1, −3, −3, −1, 1, 3, −1, 3, 1, −3

Optionally, in the eighteenth group, the value of φ(n) of the uplink signal base sequence is: 3, 1, 1, −1, −3, 3, −1, 3, −3, −1, −1, 1.

Optionally, in the 19th group, the value of φ(n) of the uplink signal base sequence is: −3, 3, −1, −3, 3, 1, 1, 1, 3, −3, 1, 3.

Optionally, in the 20th group, the value of φ(n) of the uplink signal base sequence is: 1, −3, 3, −1, 3, −1, 1, 3, 3, 3, 1, 1.

Optionally, in the 21st group, the value of φ(n) of the uplink signal base sequence is: −3, 1, −1, −3, 3, 3, 3, −3, −3, −1, 3, −3.

Optionally, in the 22nd group, the value of φ(n) of the uplink signal base sequence is: −3, −3, −3, −3, 1, −3, 1, 1, −3, −3, 1, 1.

Optionally, in the 23rd group, the value of φ(n) of the uplink signal base sequence is: −3, −3, −1, −1, 3, 3, 1, 1, −3, 1, −3, 1.

Optionally, in the 24th group, the value of φ(n) of the uplink signal base sequence is: 3, 1, 1, −1, 3, 1, −3, 1, 3, −3, −1, −1.

Optionally, in the 25th group, the value of φ(n) of the uplink signal base sequence is: 1, −3, −1, 3, −1, 3, 1, −1, −1, −1, 1, 1.

Optionally, in group 26, the value of φ(n) of the uplink signal base sequence is 1, 1, 3, 3, −1, −3, 1, 3, −1, −1, −3, −3.

Optionally, in the 27th group, the value of φ(n) of the uplink signal base sequence is: −3, −1, 1, 3, −3, 3, 3, 1, 3, 1, −3, 3.

Optionally, in the 28th group, the value of φ(n) of the uplink signal base sequence is: 1, −3, 3, −1, 3, −3, −1, −1, −1, −1, −3, −3.

Optionally, in the 29th group, the value of the φ(n) of the uplink signal base sequence is: −1, −1, −1, −1, 1, −3, −1, 3, 3, −1, −3, 1.

Optionally, in the 30th group, the value of φ(n) of the uplink signal base sequence is: 3, 1, 3, −3, 3, −3, −1, −3, 3, −3, 3, 1.

The base station provided in this embodiment may execute the foregoing method embodiments, and the implementation principles and technical effects are similar, which will not be described herein again.

Figure 7:
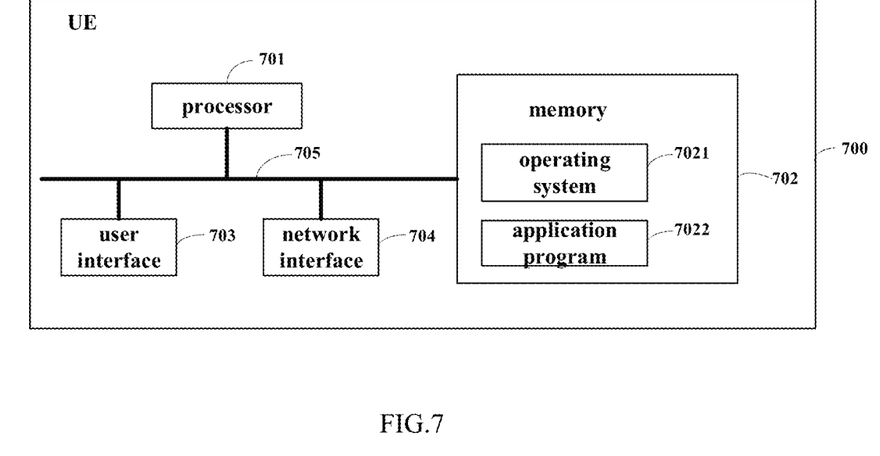
FIG. 7 is a second schematic view of a UE in an embodiment of the present disclosure.

As shown in FIG. 7, the terminal 700 shown in FIG. 7 includes: at least one processor 701, a memory 702, at least one network interface 704, and a user interface 703. The various components in the terminal 700 are coupled together through a bus system 705. It may be understood that the bus system 705 is configured to implement connection and communication between these components. The bus system 705 includes a power bus, a control bus, and a status signal bus in addition to the data bus. However, for the sake of clarity, various buses are marked as the bus system 705 in FIG. 7.

The user interface 703 may include a display, a keyboard, or a pointing device (for example, a mouse, a trackball, a touch panel, or a touch screen).

It may be understood that the memory 702 in the embodiment of the present disclosure may be a volatile memory or a non-volatile memory, or may include both volatile and non-volatile memory. The non-volatile memory may be a read-only memory (ROM), a programmable read-only memory (PROM), an erasable programmable read-only memory (EPROM), and an electronic memory, erase programmable read-only memory (EEPROM) or flash memory. The volatile memory may be Random Access Memory (RAM), which is used as an external cache. By way of example, but not limitation, many forms of RAM are available, such as Static Random Access Memory (SRAM), Dynamic Random Access Memory (DRAM), Synchronous Dynamic Random Access Memory (SDRAM), double data rate synchronous dynamic random access memory (Double Data Rate SDRAM, DDRSDRAM), enhanced synchronous dynamic random access memory (ESDRAM), synchronous connection dynamic random access memory (SLDRAM) and direct memory bus random access memory (DRRAM). The memory 602 of the systems and methods described in embodiments of the present disclosure is intended to include, but is not limited to, these and any other suitable types of memory.

In some implementations, the memory 702 stores the following elements, executable modules or data structures, or a subset of them, or their extended set: the operating system 7021 and the application program 7022.

The operating system 7021 includes various system programs, such as a framework layer, a core library layer, and a driver layer, etc., for implementing various basic services and processing hardware-based tasks. The application program 7022 includes various application programs, such as a media player (Player), a browser (Browser), and the like, and is configured to implement various application services. A program for implementing the method of the embodiment of the present disclosure may be included in the application program 7022.

In the embodiment of the present disclosure, the called program or instruction stored in the memory 702 may specifically include: the program or instruction stored in the application program 7022, and the steps in the method of generating an uplink signal sequence are implemented when executing the application program 7022.

The method disclosed in the foregoing embodiments of the present disclosure may be applied to the processor 701, or implemented by the processor 701. The processor 701 may be an integrated circuit chip and has a signal processing capability. In the implementation process, each step of the above method may be completed by using hardware integrated logic circuits or instructions in the form of software in the processor 701. The above processor 701 may be a general-purpose processor, a digital signal processor (DSP), an application specific integrated circuit (ASIC), a ready-made programmable gate array (Field Programmable Gate Array, FPGA), or other Programmable logic devices, discrete gate or transistor logic devices, discrete hardware components. Various methods, steps, and logical block diagrams disclosed in the embodiments of the present disclosure may be implemented or executed. A general-purpose processor may be a microprocessor or the processor may be any conventional processor or the like. The steps of the method disclosed in combination with the embodiments of the present disclosure may be directly embodied as being executed by a hardware decoding processor, or may be executed and completed by using a combination of hardware and software modules in the decoding processor. The software module may be located in a mature storage medium such as a random access memory, a flash memory, a read-only memory, a programmable read-only memory, or an electrically erasable programmable memory, a register, and the like. The storage medium is located in the memory 702, and the processor 701 reads the information in the memory 702 and performs the steps of the foregoing method in combination with its hardware.

Figure 8:
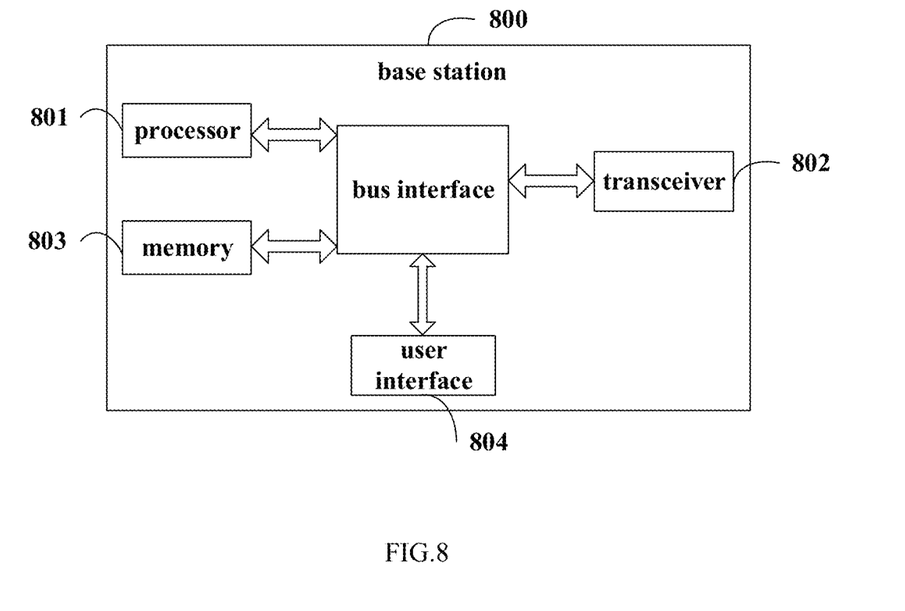
FIG. 8 is a second schematic view of a base station in an embodiment of the present disclosure.

A base station is provided in an embodiment of the present disclosure. FIG. 8 is a schematic view of a base station 800 in an embodiment of the present disclosure. As shown in FIG. 8, the base station 800 includes: a processor 801, a transceiver 802, a memory 803, a user interface 804, and a bus interface.

The processor 801 may be responsible for managing the bus architecture and general processing. The memory 803 may store data used by the processor 801 when performing operations.

In the embodiment of the present disclosure, the base station 800 may further include a computer program stored in the memory 803 and executable on the processor 801. The computer program is executed by the processor 801 to: generate an uplink signal sequence $r_{u,v}^{(\alpha)}(n)$ based on $r_{u,v}^{(\alpha)}(n)=e^{j\alpha n}\bar{r}_{u,v}(n)$, $0 \leq n < 12$, where a is configured to distinguish a terminal, an uplink signal base sequence $\bar{r}_{u,v}(n)=e^{j\varphi(n)\pi/4}$, where u represents a group number, and v represents an intra-group base sequence number, $\varphi(n)\pi/4$ represents a phase of a base sequence; perform a full traversal of multiple possible phases of the phase $\varphi(n)\pi/4$ on the uplink signal sequence with a length of 12, and select a predetermined number of uplink signal sequences with a lowest peak-to-average power ratio and a lowest cross-correlation characteristic In the drawings, the bus architecture may include any number of interconnected buses and bridges. Specifically, one or more processors represented by the processor 801 and various circuits of the memory represented by the memory 803 are linked together. The bus architecture can also link various other circuits such as peripheral devices, voltage regulators, and power management circuits, which are well known in the art, and therefore, the embodiments of this disclosure will not further describe them. The bus interface provides an interface. The transceiver 802 may be multiple elements, including a transmitter and a receiver, providing a unit for communicating with various other devices over a transmission medium. For different UEs, the user interface 804 may also be an interface capable of externally connecting internally required devices. The connected devices include, but are not limited to, a keypad, a display, a speaker, a microphone, a joystick, and the like.

A computer-readable storage medium storing a program is further provided in an embodiment of the present disclosure, where the program is executed by a processor to perform the method of generating an uplink signal sequence hereinabove.

The steps of the method or algorithm described in connection with the present disclosure may be implemented in a hardware manner, or may be implemented in a manner in which a processor executes software instructions. The software instructions may be composed of corresponding software modules, and the software modules may be stored in RAM, flash memory, ROM, EPROM, EEPROM, registers, hard disk, mobile hard disk, read-only optical disk, or any other form of storage medium known in the art. An exemplary storage medium is coupled to the processor such that the processor can read information from, and write information to, the storage medium. Of course, the storage medium may also be an integral part of the processor. The processor and the storage medium may reside in an ASIC. In addition, the ASIC may be located in a core network interface device. Of course, the processor and the storage medium can also exist as discrete components in the core network interface device.

Those skilled in the art should appreciate that, in one or more of the above examples, the functions described in this disclosure may be implemented in hardware, software, firmware, or any combination thereof. When implemented in software, the functions may be stored on a computer-readable medium or transmitted as one or more instructions or code on a computer-readable medium. Computer-readable media includes computer storage media and communication media including any medium that facilitates transfer of a computer program from one place to another. A storage media may be any available media that may be accessed by a general purpose or special purpose computer.

The specific implementation manners described above further describe the objectives, technical solutions, and beneficial effects of the present disclosure in detail. It should be understood that the foregoing descriptions are merely specific implementation manners of the disclosure, and are not intended to limit the present disclosure. The scope of protection, any modification, equivalent replacement, and improvement made on the basis of the technical solution of this disclosure shall be included in the scope of the present disclosure.

Those skilled in the art should understand that the embodiments of the present disclosure may be provided as a method, a system, or a computer program product. Therefore, the embodiments of the present disclosure may take the form of an entirely hardware embodiment, an entirely software embodiment, or an embodiment combining software and hardware aspects. Moreover, the embodiments of the present disclosure may take the form of a computer program product implemented on one or more computer-usable storage media (including but not limited to disk storage, CD-ROM, optical storage, etc.) containing computer-usable program code.

Embodiments of the present disclosure are described with reference to flowcharts and/or block diagrams of methods, devices (systems), and computer program products according to embodiments of the present disclosure. It should be understood that each process and/or block in the flowcharts and/or block diagrams, and combinations of processes and/or blocks in the flowcharts and/or block diagrams may be implemented by computer program instructions. These computer program instructions may be provided to a processor of a general-purpose computer, special-purpose computer, embedded processor, or other programmable data processing device to produce a machine, so that the instructions generated by the processor of the computer or other programmable data processing device are configured to generate instructions means for implementing the functions specified in one or more flowcharts and/or one or more blocks of the block diagrams.

These computer program instructions may also be stored in a computer-readable memory capable of directing a computer or other programmable data processing device to work in a particular manner such that the instructions stored in the computer-readable memory produce a manufactured article including an instruction device, the instructions The device implements the functions specified in one or more flowcharts and/or one or more blocks of the block diagram.

These computer program instructions may also be loaded on a computer or other programmable data processing device, so that a series of steps may be performed on the computer or other programmable device to produce a computer-implemented process, which may be executed on the computer or other programmable device. The instructions provide steps for implementing the functions specified in one or more flowcharts and/or one or more blocks of the block diagrams.

Obviously, those skilled in the art may make various modifications and variations to the embodiments of the present disclosure without departing from the scope of the present disclosure. Therefore, if these modifications and variations to the embodiments of the present disclosure fall within the scope of the claims and equivalent thereof, these modifications and variations should be considered as the scope of the present disclosure.

What is claimed is:

1. A method of generating an uplink signal sequence, the method comprising:

generating the uplink signal sequence $r_{u,v}^{(\alpha)}(n)$ based on $r_{u,v}^{(\alpha)}(n)=e^{j\alpha n}\bar{r}_{u,v}(n)$, $0 \leq n \leq 12$, wherein $\alpha$ is configured to distinguish a terminal, an uplink signal base sequence $\bar{r}_{u,v}(n)=e^{j\varphi(n)\pi/4}$, wherein u represents a group number, and v represents an intra-group base sequence number, $\varphi(n)\pi/4$ represents a phase of a base sequence;

performing a full traversal of multiple possible phases of the phase $\varphi(n)\pi/4$ on the uplink signal sequence with a length of 12, and selecting a predetermined number of uplink signal sequences with a lowest peak-to-average power ratio and a lowest cross-correlation characteristic;

wherein a value of $\varphi(n)$ of the uplink signal base sequence is: −3, 1, −3, 1, −3, −3, 3, 3, −1, −1, 1, 1; or a value of $\varphi(n)$ of the uplink signal base sequence is: −1, −3, −3, 3, −3, 3, −1, −3, −1, 1, 3, −3; or a value of $\varphi(n)$ of the uplink signal base sequence is: 3, −1, 3, −1, 3, 3, −1, −1, 3, 3, 3, 3; or a value of $\varphi(n)$ of the uplink signal base sequence is: −3, 3, −1, −3, −1, −3, −3, 3, −3, −1, 1, 3; or a value of $\varphi(n)$ of the uplink signal base sequence is: 1, 1, −1, −1, 3, 3, −3, −3, 1, −3, 1, −3; or a value of $\varphi(n)$ of the uplink signal base sequence is: 1, −3, 1, −3, 1, 1, 3, 3, −1, −1, −3, −3; or a value of $\varphi(n)$ of the uplink signal base sequence is: −1, −3, −1, 1, −1, 1, 3, 1, −1, 1, −1, −3; or a value of $\varphi(n)$ of the uplink signal base sequence is: 3, −1, 1, −3, −3, 1, −1, 3, 3, 3, 3; or a value of $\varphi(n)$ of the uplink signal base sequence is: −1, 1, 1, 3, 1, 3, −1, 1, −1, −3, 3, 1; or a value of $\varphi(n)$ of the uplink signal base sequence is: 1, 3, −1, 1, −1, 1, 3, 1, −1, −3, 3; or a value of $\varphi(n)$ of the uplink signal base sequence is: −1, 3, 1, −3, −3, 1, 3, −1, −1, −1, −1, −1; or a value of $\varphi(n)$ of the uplink signal base sequence is: 3, 3, 1, 1, 1, 3, −3, 1, −3, 3, −1; or a value of $\varphi(n)$ of the uplink signal base sequence is: 1, 1, 1, −3, −3, −3, 1, −3, −3, 1, −3, −3; or a value of $\varphi(n)$ of the uplink signal base sequence is: −1, 1, 3, −3, −1, −3, 1, −1, 1, −1, −1, −3; or a value of $\varphi(n)$ of the uplink signal base sequence is: 3, 3, 1, 1, 3, −3, 1, −3, 1, −1, 3; or a value of $\varphi(n)$ of the uplink signal base sequence is: 1, −3, −3, 1, 1, 1, −3, 1, 1, −3, 1; or a value of $\varphi(n)$ of the uplink signal base sequence is: −3, −1, 3, −3, −1, 1, 1, 1, −1, −3, 1, −1; or a value of $\varphi(n)$ of the uplink signal base sequence is: 3, 1, 1, −1, −3, 3, −1, 3, −3, −1, −1, 1; or a value of $\varphi(n)$ of the uplink signal base sequence is: −3, 3, −1, −3, 3, 1, 1, 1, 3, −3, 1, 3; or a value of $\varphi(n)$ of the uplink signal base sequence is: 1, −3, 3, −1, 3, −1, 1, 3, 3, 3, 1, 1; or a value of $\varphi(n)$ of the uplink signal base sequence is: −3, −3, −3, −3, 1, −1, 3, 3, −1, 1, −3; or a value of $\varphi(n)$ of the uplink signal base sequence is: −3, −3, −3, 1, −3, 1, 1, −3, −3, 1, 1; or a value of $\varphi(n)$ of the uplink signal base sequence is: −3, −3, −1, −1, 3, 3, 1, 1, −3, 1, −3, 1; or a value of $\varphi(n)$ of the uplink signal base sequence is: −1, −1, −1, −1, 3, −3, 1, 1, −3, 3, −1; or a value of $\varphi(n)$ of the uplink signal base sequence is: 1, −3, −1, 3, −1, 3, 1, −1, −1, −1, 1, 1; or a value of $\varphi(n)$ of the uplink signal base sequence is: 1, 3, −1, 1, 3, 3, 3, 1, −1, −3, 1, −1; or a value of $\varphi(n)$ of the uplink signal base sequence is: −3, −1, 1, 3, −3, 3, 3, 1, 3, 1, −3, 3; or a value of $\varphi(n)$ of the uplink signal base sequence is: 1, −3, 3, −1, 3, −3, −1, −1, −1, −1, −3, −3; or a value of $\varphi(n)$ of the uplink signal base sequence is: −3, 3, 1, 3, 1, −1, 1, 3, 1, 3, −3, 3; or a value of $\varphi(n)$ of the uplink signal base sequence is: −3, −3, −1, −1, −1, −3, 3, −1, 3, −1, 1, −3; or a value of $\varphi(n)$ of the uplink signal base sequence is: −3, −3, 3, 1, −3, −3, −3, −1, 3, −1, 1, 3; or a value of $\varphi(n)$ of the uplink signal base sequence is: 1, 1, −1, −3, −3, −1, 1, 3, −1, 3, 1, −3; or a value of $\varphi(n)$ of the uplink signal base sequence is: −3, 1, −1, −3, 3, 3, 3, −3, −3, −1, 3, −3; or a value of $\varphi(n)$ of the uplink signal base sequence is: 3, 1, 1, −1, 3, 1, −3, 1, 3, −3, −1, −1; or a value of $\varphi(n)$ of the uplink signal base sequence is: 1, 3, 3, −1, −3, 1, 3, −1, −1, −3, −3; or a value of $\varphi(n)$ of the uplink signal base sequence is: −1, −1, −1, −1, 1, −3, −1, 3, 3, −1, −3, 1; or a value of $\varphi(n)$ of the uplink signal base sequence is: 3, 1, 3, 3, −3, −3, −1, −3, 3, −3, 3, 1.

2. A User Equipment (UE), comprising: a memory, a processor, a transceiver, and a program stored in the memory and executable on the processor, wherein the program is executed by the processor to perform the method of generating an uplink signal sequence according to claim 1.

3. A base station, comprising: a memory, a processor, a transceiver, and a program stored in the memory and executable on the processor, wherein the program is executed by the processor to perform the method of generating an uplink signal sequence according to claim 1.

* * * * *